US012070631B2

(12) United States Patent
Lee et al.

(10) Patent No.: US 12,070,631 B2
(45) Date of Patent: Aug. 27, 2024

(54) MASK APPARATUS

(71) Applicant: LG Electronics Inc., Seoul (KR)

(72) Inventors: Keonwang Lee, Seoul (KR); Hojung Kim, Seoul (KR); Taejun Kim, Seoul (KR); Chiyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 695 days.

(21) Appl. No.: 17/231,462

(22) Filed: Apr. 15, 2021

(65) Prior Publication Data

US 2021/0379417 A1 Dec. 9, 2021

(30) Foreign Application Priority Data

Jun. 5, 2020 (KR) ........................ 10-2020-0068404

(51) Int. Cl.
*A62B 18/00* (2006.01)
*A62B 18/02* (2006.01)
(Continued)

(52) U.S. Cl.
CPC ............ *A62B 18/006* (2013.01); *A62B 18/02* (2013.01); *A62B 18/08* (2013.01); *A62B 23/02* (2013.01)

(58) Field of Classification Search
CPC ....... A62B 18/00; A62B 18/006; A62B 18/02; A62B 18/025; A62B 18/08; A62B 18/045; A62B 23/00; A62B 23/02; A62B 23/025; A41D 13/002; A41D 13/0025; A41D 13/11; A41D 13/1123; A41D 13/1138; A41D 13/1153; A41D 13/1176
See application file for complete search history.

(56) References Cited

U.S. PATENT DOCUMENTS 4,546,793 A 10/1985 Stupecky
4,646,732 A 3/1987 Chien
(Continued)

FOREIGN PATENT DOCUMENTS

CN 1455270 11/2003
CN 103505788 1/2014
(Continued)

OTHER PUBLICATIONS

Office Action in Japanese Appln. No. 2020-204668, dated Feb. 7, 2022, 12 pages (with English translation).
(Continued)

*Primary Examiner* — Kendra D Carter
*Assistant Examiner* — Lanie Elizabeth Ratterree
(74) *Attorney, Agent, or Firm* — Fish & Richardson P.C.

(57) ABSTRACT

A mask apparatus includes a mask body configured to receive a battery at a center region of a front surface of the mask body, a plurality of electronic components that are disposed at the mask body and that include a pair of fan modules configured to be disposed at left and right sides of the battery, respectively, and a control module configured to be disposed between the battery and at least one of the pair of fan modules, and a mask body cover that is coupled to the mask body and covers the plurality of electronic components. The center region configured to receive the battery, the pair of fan modules, and the control module are arranged along a widthwise direction of the mask body.

18 Claims, 14 Drawing Sheets

(51) Int. Cl.

| | |
|---|---|
| ***A62B 18/08*** | (2006.01) |
| ***A62B 23/02*** | (2006.01) |

(56) References Cited

U.S. PATENT DOCUMENTS

| | | | | |
|---|---|---|---|---|
| 5,062,421 | A | 11/1991 | Burns et al. | |
| 5,372,130 | A | 12/1994 | Stern et al. | |
| 5,782,234 | A | 7/1998 | Bates | |
| 6,213,119 | B1 | 4/2001 | Brydon et al. | |
| 6,543,450 | B1 * | 4/2003 | Flynn | A62B 18/02 128/206.25 |
| 8,667,959 | B2 | 3/2014 | Tilley et al. | |
| 10,226,542 | B2 | 3/2019 | Messina et al. | |
| 10,342,999 | B2 | 7/2019 | Song et al. | |
| 10,661,104 | B2 | 5/2020 | Morgan et al. | |
| 11,241,594 | B2 | 2/2022 | Szasz et al. | |
| 2003/0052279 | A1 | 3/2003 | Kikuchi | |
| 2003/0066257 | A1 | 4/2003 | Shovlin | |
| 2003/0066527 | A1 | 4/2003 | Chen | |
| 2005/0145249 | A1 | 7/2005 | Solyntjes et al. | |
| 2006/0076012 | A1 | 4/2006 | Tanizawa et al. | |
| 2007/0125385 | A1 | 6/2007 | Ho et al. | |
| 2009/0320847 | A1 | 12/2009 | Bozanic et al. | |
| 2010/0101575 | A1 | 4/2010 | Fedorko et al. | |
| 2010/0224190 | A1 | 9/2010 | Tilley et al. | |
| 2010/0313892 | A1 | 12/2010 | Shigematsu et al. | |
| 2010/0329924 | A1 | 12/2010 | Harris | |
| 2011/0126713 | A1 | 6/2011 | Legare et al. | |
| 2014/0216475 | A1 | 8/2014 | Blomberg et al. | |
| 2014/0360501 | A1 | 12/2014 | Guiducci et al. | |
| 2015/0034080 | A1 | 2/2015 | Furuichi et al. | |
| 2015/0047642 | A1 | 2/2015 | Tucker et al. | |
| 2015/0136142 | A1 | 5/2015 | Blomberg | |
| 2015/0151143 | A1 | 6/2015 | Langford | |
| 2015/0202473 | A1 | 7/2015 | Curran et al. | |
| 2015/0217144 | A1 | 8/2015 | Skov et al. | |
| 2015/0217146 | A1 | 8/2015 | Skov et al. | |
| 2015/0250915 | A1 | 9/2015 | Pugh et al. | |
| 2015/0289598 | A1 | 10/2015 | Hsiung | |
| 2015/0306324 | A1 | 10/2015 | Ayon et al. | |
| 2015/0362478 | A1 | 12/2015 | Phillips | |
| 2016/0001111 | A1 | 1/2016 | Morgan et al. | |
| 2016/0022944 | A1 | 1/2016 | Chodkowski et al. | |
| 2016/0030778 | A1 | 2/2016 | Skov et al. | |
| 2016/0030779 | A1 | 2/2016 | Twu et al. | |
| 2016/0074604 | A1 | 3/2016 | Bronner et al. | |
| 2016/0236016 | A1 | 8/2016 | Ono et al. | |
| 2016/0279450 | A1 | 9/2016 | Goldstein et al. | |
| 2017/0136271 | A1 | 5/2017 | Munster | |
| 2017/0157353 | A1 | 6/2017 | Olsen et al. | |
| 2018/0078798 | A1 | 3/2018 | Fabian et al. | |
| 2018/0177965 | A1 | 6/2018 | Patel | |
| 2018/0185677 | A1 | 7/2018 | Curran et al. | |
| 2018/0236275 | A1 | 8/2018 | Song et al. | |
| 2018/0318457 | A1 | 11/2018 | Lucio | |
| 2019/0009114 | A1 | 1/2019 | Han | |
| 2019/0113501 | A1 | 4/2019 | Jameson et al. | |
| 2019/0160249 | A1 | 5/2019 | Rose et al. | |
| 2019/0175962 | A1 | 6/2019 | Su et al. | |
| 2019/0275357 | A1 | 9/2019 | Palmer, Jr. et al. | |
| 2020/0008539 | A1 | 1/2020 | Kolasa | |
| 2020/0038614 | A1 | 2/2020 | Duff et al. | |
| 2020/0086071 | A1 | 3/2020 | Lin et al. | |
| 2020/0087031 | A1 | 3/2020 | Yoo et al. | |
| 2020/0129650 | A1 | 4/2020 | Kim et al. | |
| 2020/0155877 | A1 | 5/2020 | Key et al. | |
| 2021/0228920 | A1 | 7/2021 | Arigue et al. | |
| 2021/0337891 | A1 | 11/2021 | Shah et al. | |
| 2021/0378325 | A1 | 12/2021 | Mun et al. | |
| 2021/0379412 | A1 | 12/2021 | Lee et al. | |
| 2021/0379418 | A1 | 12/2021 | Kim et al. | |
| 2021/0402222 | A1 | 12/2021 | Kwon et al. | |
| 2022/0016449 | A1 | 1/2022 | Choi et al. | |

FOREIGN PATENT DOCUMENTS

| | | | | |
|---|---|---|---|---|
| CN | 103751919 | | 4/2014 | |
| CN | 104162236 | | 11/2014 | |
| CN | 203943119 | | 11/2014 | |
| CN | 104826247 | | 8/2015 | |
| CN | 204637356 | | 9/2015 | |
| CN | 105126219 | | 12/2015 | |
| CN | 105167366 | | 12/2015 | |
| CN | 105476118 | | 4/2016 | |
| CN | 105495776 | | 4/2016 | |
| CN | 105641821 | | 6/2016 | |
| CN | 205285072 | | 6/2016 | |
| CN | 106039607 | | 10/2016 | |
| CN | 106235464 | | 12/2016 | |
| CN | 106253937 | | 12/2016 | |
| CN | 106730464 | | 5/2017 | |
| CN | 106847663 | | 6/2017 | |
| CN | 107149182 | | 9/2017 | |
| CN | 206459266 | | 9/2017 | |
| CN | 107224687 | | 10/2017 | |
| CN | 107224687 | A * | 10/2017 | A62B 18/02 |
| CN | 206577264 | | 10/2017 | |
| CN | 107308564 | | 11/2017 | |
| CN | 107405508 | | 11/2017 | |
| CN | 107735148 | | 2/2018 | |
| CN | 206995630 | | 2/2018 | |
| CN | 207011751 | | 2/2018 | |
| CN | 207040968 | | 2/2018 | |
| CN | 207041756 | | 2/2018 | |
| CN | 207152901 | | 3/2018 | |
| CN | 207604526 | | 7/2018 | |
| CN | 207721249 | | 8/2018 | |
| CN | 207836817 | | 9/2018 | |
| CN | 108635689 | | 10/2018 | |
| CN | 208145256 | | 11/2018 | |
| CN | 109078277 | | 12/2018 | |
| CN | 208403333 | | 1/2019 | |
| CN | 208611622 | | 3/2019 | |
| CN | 208694061 | | 4/2019 | |
| CN | 109924568 | | 6/2019 | |
| CN | 111135492 | | 5/2020 | |
| CN | 111565763 | | 8/2020 | |
| EP | 0558147 | | 9/1993 | |
| EP | 0621056 | | 10/1994 | |
| EP | 2913083 | | 9/2015 | |
| EP | 3446755 | | 2/2019 | |
| EP | 3446756 | | 2/2019 | |
| GB | 1155046 | | 6/1969 | |
| JP | H05137808 | | 6/1993 | |
| JP | 3039303 | | 7/1997 | |
| JP | H09225012 | | 9/1997 | |
| JP | 10066817 | | 3/1998 | |
| JP | H10165527 | | 6/1998 | |
| JP | 3077655 | | 5/2001 | |
| JP | 2003322712 | | 11/2003 | |
| JP | 2004364177 | | 12/2004 | |
| JP | 3117209 | U | 1/2006 | |
| JP | 2007236600 | | 9/2007 | |
| JP | 2011078604 | | 4/2011 | |
| JP | 2011078678 | | 4/2011 | |
| JP | 2011115449 | | 6/2011 | |
| JP | 2012-075793 | | 4/2012 | |
| JP | 2013127129 | | 6/2013 | |
| JP | 3196218 | | 2/2015 | |
| JP | 2015093036 | | 5/2015 | |
| JP | 2015-524337 | | 8/2015 | |
| JP | 2015527130 | | 9/2015 | |
| JP | 2016087376 | | 5/2016 | |
| JP | 2018000982 | | 1/2018 | |
| JP | 2018033905 | | 3/2018 | |
| JP | 2018089158 | | 6/2018 | |
| JP | 2018-146805 | | 9/2018 | |
| JP | 2019501721 | | 1/2019 | |
| KR | 10-1989-0000137 | | 3/1989 | |
| KR | 10-1995-0008732 | | 8/1995 | |
| KR | 20050061384 | | 6/2005 | |
| KR | 20100081991 | | 7/2010 | |
| KR | 20-2010-0009804 | | 10/2010 | |

(56) References Cited

FOREIGN PATENT DOCUMENTS

| | | | | | |
|---|---|---|---|---|---|
| KR | 1020110067854 | | | 6/2011 | |
| KR | 20120051735 | | | 5/2012 | |
| KR | 200461294 | | | 7/2012 | |
| KR | 101228403 | | | 1/2013 | |
| KR | 101536265 | | | 7/2015 | |
| KR | 101554664 | | | 9/2015 | |
| KR | 101619487 | | | 5/2016 | |
| KR | 20160062808 | | | 6/2016 | |
| KR | 20160129562 | | | 11/2016 | |
| KR | 20160132159 | | | 11/2016 | |
| KR | 1020160129562 | | | 11/2016 | |
| KR | 101733470 | | | 4/2017 | |
| KR | 20170111132 | | | 10/2017 | |
| KR | 20170126163 | | | 11/2017 | |
| KR | 20180009326 | | | 1/2018 | |
| KR | 1020180009326 | | | 1/2018 | |
| KR | 10-2018-0012496 | | | 2/2018 | |
| KR | 101827016 | | | 2/2018 | |
| KR | 1020180027561 | | | 3/2018 | |
| KR | 101849610 | | | 4/2018 | |
| KR | 20180043234 | | | 4/2018 | |
| KR | 10-2018-0045934 | | | 5/2018 | |
| KR | 20180045934 | | | 5/2018 | |
| KR | 20180064284 | | | 6/2018 | |
| KR | 20180091698 | | | 8/2018 | |
| KR | 20180128040 | | | 11/2018 | |
| KR | 10-2018-0130658 | | | 12/2018 | |
| KR | 101925388 | | | 12/2018 | |
| KR | 1020180135840 | | | 12/2018 | |
| KR | 10-1942785 | | | 1/2019 | |
| KR | 20190033299 | | | 3/2019 | |
| KR | 1020190033299 | | | 3/2019 | |
| KR | 10-2019-0053757 | | | 5/2019 | |
| KR | 10-2019-0022668 | | | 6/2019 | |
| KR | 102002878 | | | 7/2019 | |
| KR | 1020190089188 | | | 7/2019 | |
| KR | 1020190096496 | | | 8/2019 | |
| KR | 102023974 | | | 9/2019 | |
| KR | 10-2019-0119804 | | | 10/2019 | |
| KR | 101997813 | | | 10/2019 | |
| KR | 20190119804 | A | * | 10/2019 | ......... A41D 13/1161 |
| KR | 102065360 | | | 2/2020 | |
| KR | 1020200033495 | | | 3/2020 | |
| KR | 102110687 | | | 5/2020 | |
| KR | 20200048502 | | | 5/2020 | |
| KR | 20200048502 | A | * | 5/2020 | ........... A62B 18/006 |
| KR | 1020200048502 | | | 5/2020 | |
| KR | 1020200049490 | | | 5/2020 | |
| KR | 1020200079925 | | | 7/2020 | |
| TW | 201201879 | | | 1/2012 | |
| TW | M555232 | | | 2/2018 | |
| TW | 201904614 | | | 2/2019 | |
| WO | WO 1996/22124 | | | 7/1996 | |
| WO | WO-9622124 | A1 | * | 7/1996 | ........... A61N 1/0436 |
| WO | WO2009067583 | | | 5/2009 | |
| WO | WO2010070495 | | | 6/2010 | |
| WO | WO2014020469 | | | 2/2014 | |
| WO | WO 2016/072868 | | | 5/2016 | |
| WO | WO2016157159 | | | 10/2016 | |
| WO | WO20170004313 | | | 1/2017 | |
| WO | WO2017116174 | | | 7/2017 | |
| WO | WO2018036902 | | | 3/2018 | |
| WO | WO2018147941 | | | 8/2018 | |
| WO | WO 2019/059699 | | | 3/2019 | |
| WO | WO2020055106 | | | 3/2020 | |
| WO | WO2020094850 | | | 5/2020 | |

OTHER PUBLICATIONS

Office Action in Korean Appln. No. 10-2020-0080437, dated Feb. 21, 2022, 13 pages (with English translation).

Office Action in Korean Appln. No. 10-2020-0068421, dated Jan. 23, 2022, 12 pages (with English translation).

Office Action in Taiwanese Appln. No. 11120021940, dated Dec. 20, 2020, 11 pages (with English translation).

Notice of Allowance in Korean Appln. No. 10-2020-0068407, dated Nov. 29, 2021, 4 pages (with English translation).

Office Action in Korean Appln. No. 10-2020-0068400, dated Dec. 27, 2021, 13 pages (with English translation).

Office Action in Korean Appln. No. 10-2020-0068412, dated Dec. 27, 2021, 15 pages (with English translation).

Office Action in Korean Appln. No. 10-2020-0080417, dated Dec. 28, 2021, 13 pages (with English translation).

Office Action in Korean Appln. No. 10-2020-0089132, dated Dec. 28, 2021, 13 pages (with English translation).

Office Action in Korean Appln. No. 10-2020-0068413, dated Nov. 17, 2021, 13 pages (with English translation).

Office Action in Korean Appln. No. 10-2020-0080087, dated Nov. 30, 2021, 15 pages (with English translation).

Office Action in Indian Appln. No. 202114007027, dated Jan. 5, 2022, 6 pages.

Office Action in Indian Appln. No. 202114003123, dated Jan. 6, 2022, 5 pages.

Office Action in Indian Appln. No. 202114008985, dated Jan. 12, 2022, 5 pages.

Office Action in Indian Appln. No. 202114003125, dated Jan. 13, 2022, 5 pages.

Office Action in Indian Appln. No. 202114007372, dated Jan. 24, 2022, 6 pages.

Extended European Search Report in European Appln. No. 20217535.2, dated Jun. 22, 2021, 4 pages.

Extended European Search Report in European Appln. No. 20217537.8, dated Jun. 22, 2021, 4 pages.

Office Action in Korean Appln. No. 10-2020-0068404, dated Jun. 30, 2021, 12 pages (with English translation).

Office Action in Korean Appln. No. 10-2020-0068611, dated Jun. 30, 2021, 12 pages (with English translation).

Office Action in Taiwanese Appln. No. 109146705, dated Jul. 7, 2021, 19 pages (with English translation).

Office Action in Taiwanese Appln. No. 110102539, dated Jul. 12, 2021, 10 pages (with English translation).

Office Action in Taiwanese Appln. No. 110102540, dated Jul. 12, 2021, 19 pages (with English translation).

Office Action in Taiwanese Appln. No. 110105039, dated Jul. 12, 2021, 15 pages (with English translation).

Office Action in Chinese Appln. No. 202011403700.7, dated May 4, 2023, 18 pages (with English translation).

Office Action in Chinese Appln. No. 202110096186.5, dated Jun. 3, 2023, 16 pages (with English translation).

Office Action in U.S. Appl. No. 17/230,206, dated Jun. 22, 2023, 18 pages.

Office Action in U.S. Appl. No. 17/231,472, dated Jun. 23, 2023, 23 pages.

Office Action in Chinese Appln. No. 202011089763, mailed on Feb. 11, 2023, 18 pages (with English translation).

Office Action in Chinese Appln. No. 202011328031, mailed on Feb. 15, 2023, 18 pages (with English translation).

Office Action in Chinese Appln. No. 202110184702, mailed on Mar. 18, 2023, 23 pages (with English translation).

Office Action in Korean Appln. No. 20210129533, mailed on Mar. 28, 2023, 18 pages (with English translation).

Office Action in Korean Appln. No. 20220126062, mailed on Mar. 23, 2023, 23 pages (with English translation).

Office Action in U.S. Appl. No. 17/170,035, mailed on Feb. 8, 2023, 8 pages.

Office Action in U.S. Appl. No. 17/178,103, mailed on Jun. 30, 2023, 30 pages.

Extended European Search Report in European Appln. No. 21169773.5, dated Sep. 24, 2021, 4 pages.

Extended European Search Report in European Appln. No. 21169777.6, dated Sep. 24, 2021, 5 pages.

Korean Office Action in Korean Appln. No. 10-2020-0068402, dated Oct. 15, 2020, 20 pages (with English translation).

Extended European Search Report in European Appln. No. 21169778.4, dated Oct. 15, 2021, 5 pages.

Extended European Search Report in European Appln. No. 21169793.3, dated Oct. 15, 2021, 4 pages.

(56) References Cited

OTHER PUBLICATIONS

Extended European Search Report in European Appln. No. 21169796.6, dated Oct. 18, 2021, 4 pages.
Extended European Search Report in European Appln. No. 21169813.9, dated Oct. 20, 2021, 4 pages.
Extended European Search Report in European Appln. No. 21169817.0, dated Oct. 14, 2021, 4 pages.
Extended European Search Report in European Appln. No. 21170476.2, dated Oct. 13, 2021, 4 pages.
Extended European Search Report in European Appln. No. 21170861.5, dated Oct. 25, 2021, 4 pages.
Notice of Allowance in Japanese Appln. No. 2020-204668, dated Aug. 16, 2022, 5 pages (with English translation).
Office Action in Chinese Appln. No. 202110552518.6, dated Jul. 4, 2022, 18 pages (with English translation).
Decision to Grant a Patent in Japanese Appln. No. 2021-043251, dated Oct. 25, 2022, 5 pages (with English translation).
Office Action in European Appln. No. 20217533.7, dated Nov. 23, 2022, 5 pages.
Office Action in European Appln. No. 21182279.6, dated Oct. 17, 2022, 2 pages.
Office Action in Taiwanese Appln. No. 110117972, dated Oct. 7, 2022, 14 pages (with English translation).
Office Action in U.S. Appl. No. 17/170,035, dated Sep. 29, 2022, 19 pages.
Written Decision on Registration in Korean Appln. No. 10-2020-0080437, dated Oct. 22, 2022, 11 pages (with English translation).
Notice of Allowance in U.S. Appl. No. 17/178,103, mailed on Nov. 3, 2023, 12 pages.
Office Action in Korean Appln. No. 10-2022-0126062, mailed on Sep. 26, 2023, 8 pages (with English translation).
Office Action in U.S. Appl. No. 17/112,500, mailed on Nov. 28, 2023, 14 pages.
Office Action in U.S. Appl. No. 17/230,206, mailed on Oct. 12, 2023, 19 pages.
Office Action in U.S. Appl. No. 17/231,472, mailed on Oct. 23, 2023, 19 pages.
Office Action in U.S. Appl. No. 17/244,683, mailed on Oct. 13, 2023, 21 pages.
Extended European Search Report in European Appln. No. 20217533.7, dated Jun. 8, 2021, 5 pages.
Korean Office Action in Korean Appln. No. 2020-0068404, dated Apr. 5, 2021, 11 pages (with English translation).
Korean Office Action in Korean Appln. No. 2020-0068407, dated Apr. 5, 2021, 11 pages (with English translation).
Korean Office Action in Korean Appln. No. 2020-0068611, dated Apr. 5, 2021, 11 pages (with English translation).
Korean Office Action in Korean Appln. No. 2020-0109160, dated Feb. 11, 2021, 21 pages (with English translation).
Notice of Allowance in Korean Appln. No. 10-2020-0068413, dated May 31, 2022, 4 pages (with English translation).
Notice of Allowance in Korean Appln. No. 10-2020-0080087, dated Jun. 30, 2022, 5 pages (with English translation).
Office Action in Chinese Appln. No. 202011328161.5, dated Apr. 2, 2022, 15 pages (with English translation).
Office Action in Chinese Appln. No. 202110046911.8, dated Apr. 15, 2022, 12 pages (with English translation).
Office Action in Chinese Appln. No. 202110382635.2, dated Apr. 20, 2022, 12 pages (with English translation).
Office Action in Chinese Appln. No. 202110383659.X, dated Apr. 18, 2022, 13 pages (with English translation).
Office Action in Chinese Appln. No. 202110404827.9, dated Apr. 19, 2022, 13 pages (with English translation).
Office Action in Indian Appln. No. 202114011936, dated May 5, 2022, 5 pages.
Office Action in Japanese Appln. No. 2021-043251, dated May 10, 2022, 6 pages (with English translation).
Office Action in Japanese Appln. No. 2021-073811, dated May 10, 2022, 6 pages (with English translation).
Office Action in Japanese Appln. No. 2021-074825, dated Apr. 19, 2022, 6 pages (with English translation).
Office Action in Japanese Appln. No. 2021-090930, dated Jun. 14, 2022, 10 pages (with English translation).
Notice of Allowance in U.S. Appl. No. 17/174,766, mailed on Dec. 5, 2023, 12 pages.
Notice of Allowance in U.S. Appl. No. 17/244,683, mailed on Feb. 8, 2024, 14 pages.
Office Action in Chinese Appln. No.202110096186.5, mailed on Feb. 9, 2024, 7 pages (with English translation).
Office Action in U.S. Appl. No. 17/121,056, mailed on Dec. 21, 2023, 10 pages.
Office Action in U.S. Appl. No. 17/121,115, mailed on Dec. 20, 2023, 11 pages.
Office Action in U.S. Appl. No. 17/231,472, mailed on Feb. 27, 2024, 20 pages.

* cited by examiner

MASK APPARATUS

CROSS-REFERENCE TO RELATED APPLICATIONS

The present application claims the benefits of priority to Korean Patent Application No. 10-2020-0068404, filed on Jun. 5, 2020, which is herein incorporated by reference in its entirety.

TECHNICAL FIELD

The present disclosure relates to a mask apparatus.

BACKGROUND

A mask is a device that can cover a user's nose and mouth to prevent or reduce inhalation of germs and dust or droplet transmitting viruses or bacteria. The mask can be in close contact with the user's face to cover the user's nose and mouth. The mask can filter germs, dust, and the like, which may be contained in the air and provide filtered air into the user's mouth and nose. Air and germs and dust contained in the air can pass through a body of the mask including a filter configured to block the germs and the dust.

In some cases, the mask can cause uncomfortable breathing since air is introduced into the user's nose and mouth and discharged to the outside after passing through the body of the mask. In some cases, a mask can include a motor, a fan, and a filter. The mask can include a face cover having an air suction hole, an air passage portion installed inside the face cover, and a wearing portion coupled to a rear surface of the face cover to cover the air passage portion.

In some cases, the mask includes the fan disposed on an upper portion of the mask, and the relatively heavy battery is disposed on a lower portion of the mask. In such cases, the mask can droop downward due to the gravity, and a gap can be formed between the mask and the user's face.

In some cases, where the mask has both the fan module and the battery at a central portion of a front surface thereof, a weight applied to an ear can increase because the weight is not distributed throughout the mask.

In some cases, a mask may include a frame having an air suction hole, a cover coupled to a front surface of the frame, and a surface body coupled to a rear surface of the frame and in close contact with the user's face. For example, the frame can include a front frame in which an air suction hole is defined and a rear frame coupled to a rear surface of the front frame to form an inner space.

In some cases, a fan may be disposed at a central portion of the inner space, where a substrate can be disposed at one side of the fan, and the battery can be disposed at the other side of the fan.

In some cases, where the battery is relatively heavy compared to other parts, the mask can droop downward when the mask is worn for a long time. When the drooping phenomenon of the mask occurs, a gap can be formed between the user's face and the mask, which can cause inconvenience in using the mask.

In some cases, where the mask has the battery disposed at a point adjacent to the user's ear, a load on the ear can increase due to a weight of the battery, which can cause pain in the ear.

In some cases, where a capacity of the battery is designed to be small so as to reduce the weight of the battery, a usage time of the mask including the fan module may be reduced.

In some cases, it may be difficult to operate the fan at a high speed for a high air volume due to the limited capacity of the battery.

SUMMARY

The present disclosure describes a compact mask apparatus that can reduce a weight of a mask.

The present disclosure describes a mask apparatus that can reduce a load applied to an ear when the mask is hung on the ear.

The present disclosure describes a mask apparatus including a battery that has a capacity to increase a driving time of a fan and enable a high-speed operation of the fan.

The present disclosure describes a mask apparatus that can naturally cool heat of a battery and a circuit board.

According to one aspect of the subject matter described in this application, a mask apparatus includes a mask body configured to receive a battery at a center region of a front surface of the mask body, a plurality of electronic components that are disposed at the mask body and that include a pair of fan modules configured to be disposed at left and right sides of the battery, respectively, and a control module configured to be disposed between the battery and at least one of the pair of fan modules, and a mask body cover that is coupled to the mask body and covers the plurality of electronic components. The center region configured to receive the battery, the pair of fan modules, and the control module are arranged along a widthwise direction of the mask body.

Implementations according to this aspect can include one or more of the following features. For example, the control module can be configured to surround at least a portion of an outer circumference of the battery. In some implementations, the control module can include a first substrate configured to be disposed between the battery and a first fan module of the pair of fan modules, and a second substrate configured to be disposed between the battery and a second fan module of the pair of fan modules. In some examples, the control module can further include a third substrate that connects the first substrate to the second substrate and that can be configured to surround an upper edge of the battery.

In some implementations, the mask apparatus can include a seal that is coupled to a rear surface of the mask body and defines a breathing space therein. In some examples, the mask body can define an air exhaust hole a lower portion of the mask body, where the air exhaust hole is configured to discharge air exhaled into the breathing space to an outside of the mask body. In some implementations, the air exhaust hole is positioned at a front side of the breathing space. In some implementations, at least one of the battery or the control module can be configured to be disposed above the air exhaust hole.

In some implementations, the mask apparatus can include an air outlet that protrudes from the front surface of the mask body and partitions the air exhaust hole from an inner space defined between the mask body and the mask body cover. In some examples, the air outlet protrudes forward relative to the front surface of the mask body and extends along an edge of the air exhaust hole. In some examples, the air outlet can have an arch shape or a tunnel shape that extends along the edge of the air exhaust hole. In some examples, a front end of the air outlet is in contact with a rear surface of the mask body cover. In some implementations, the air outlet can include a top surface configured to support the battery.

In some implementations, the mask apparatus can include a seal that is coupled to a rear surface of the mask body and defines a breathing space therein, and the mask body includes a plurality of air ducts, where each of the plurality of air ducts defines a passage configured to guide air from one of the pair of fan modules to the breathing space.

In some implementations, the plurality of air ducts can include a first air duct configured to be disposed between the battery and the first fan module, and a second air duct configured to be disposed between the battery and the second fan module. In some examples, the first substrate can be disposed at a front surface of the first air duct, and the second substrate can be disposed at a front surface of the second air duct, where at least a portion of each of the front surface of the first air duct and the front surface of the second air duct is flat.

In some implementations, the mask body can include a battery mounting portion disposed at the center region of the front surface of the mask body and configured to accommodate the battery. In some examples, the battery mounting portion can include a vertical rib that protrudes forward from the mask body and can be configured to support a side surface of the battery, and a horizontal rib connected the vertical rib and configured to support a front surface of the battery.

In some implementations, the vertical rib can include a pair of vertical ribs that protrude forward from the mask body and are configured to support side surfaces of the battery, and the horizontal rib connects the pair of vertical ribs to each other.

In some implementations, the mask apparatus can include a support rib that extends from the front surface of the mask body and supports the control module.

In some implementations, the battery having a relatively heavy weight can be disposed at the center of the mask apparatus to reduce the load applied to the ear when the user wears the mask apparatus.

In some examples, the battery capacity can be designed to be relatively large to increase the driving time of the fan and enable operation of the fan at a high speed.

In some implementations, the control module can surround at least a portion of the periphery of the battery, where the fan module, the battery, and the control module can be arranged along a line in the widthwise direction of the mask apparatus. Accordingly, the limited inner space of the mask apparatus can be efficiently utilized to realize the compact mask apparatus.

In some implementations, the battery can provide power to the electronic components and the control module that controls operation of the electronic components. The battery and the control module can be arranged at the central portion of the mask apparatus to facilitate supply of power or arrangement of wires to the various electronic components (e.g., fan modules, sensors, etc.).

In some implementations, the battery and the control module can be disposed adjacent to an air passage of the mask apparatus configured to introduce external air, which can help natural cooling of heat generated by the battery and the circuit board.

DETAILED DESCRIPTION

Figure 1:
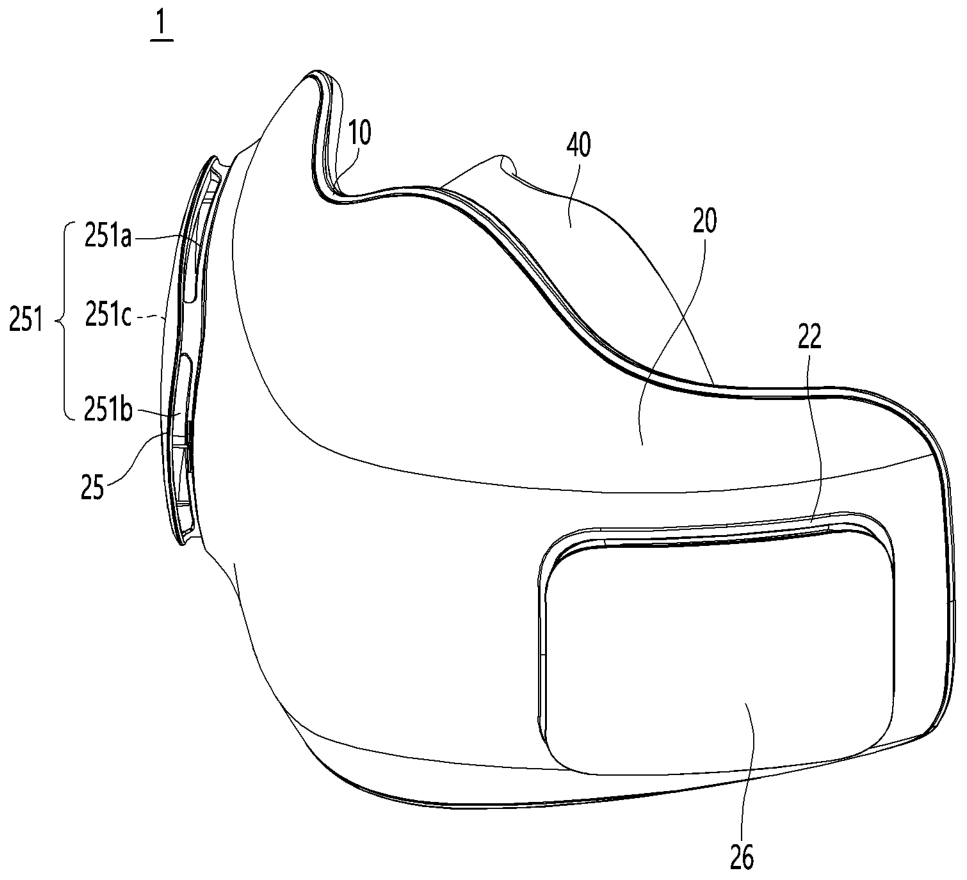
FIG. 1 is a left perspective view showing an example of a mask apparatus.
Figure 2:
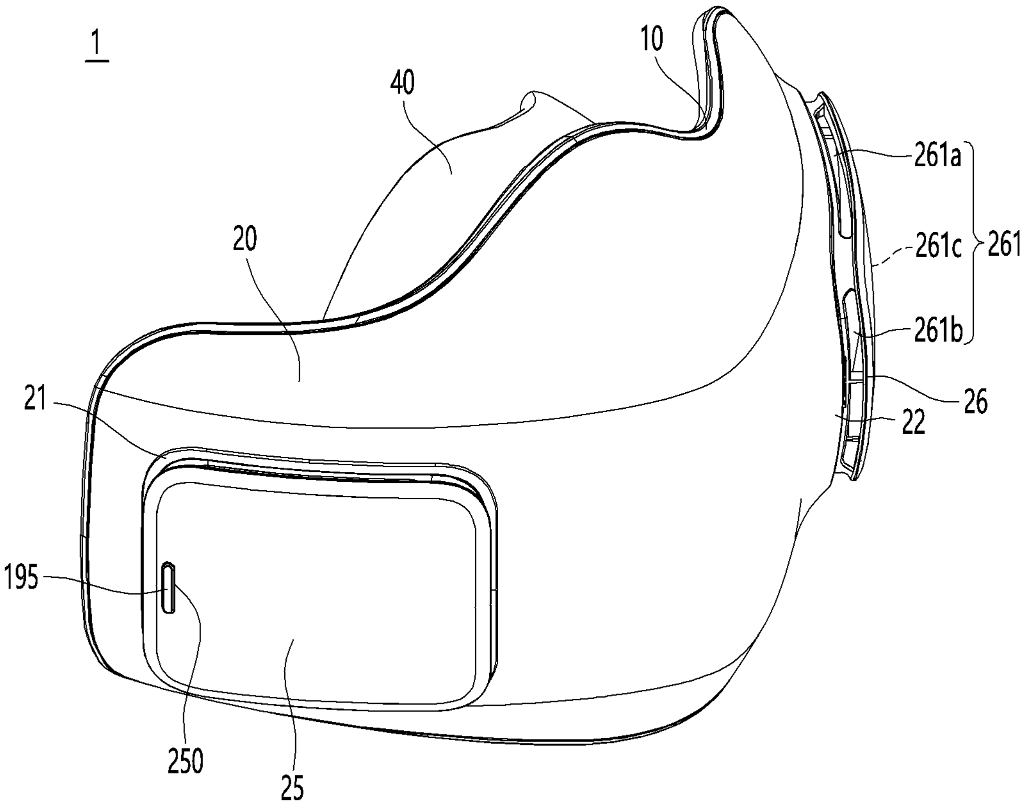
FIG. 2 is a right perspective view showing the mask apparatus.
Figure 3:
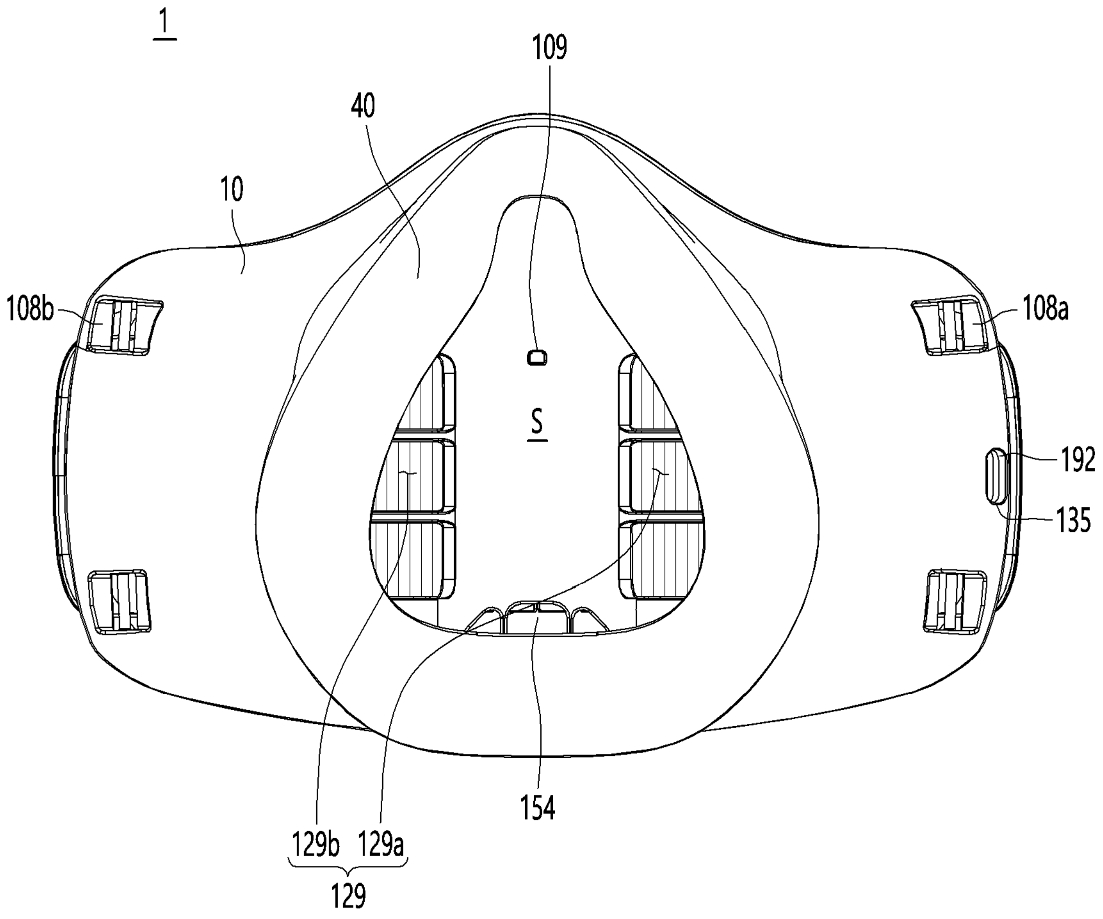
FIG. 3 is a rear view showing the mask apparatus.
Figure 4:
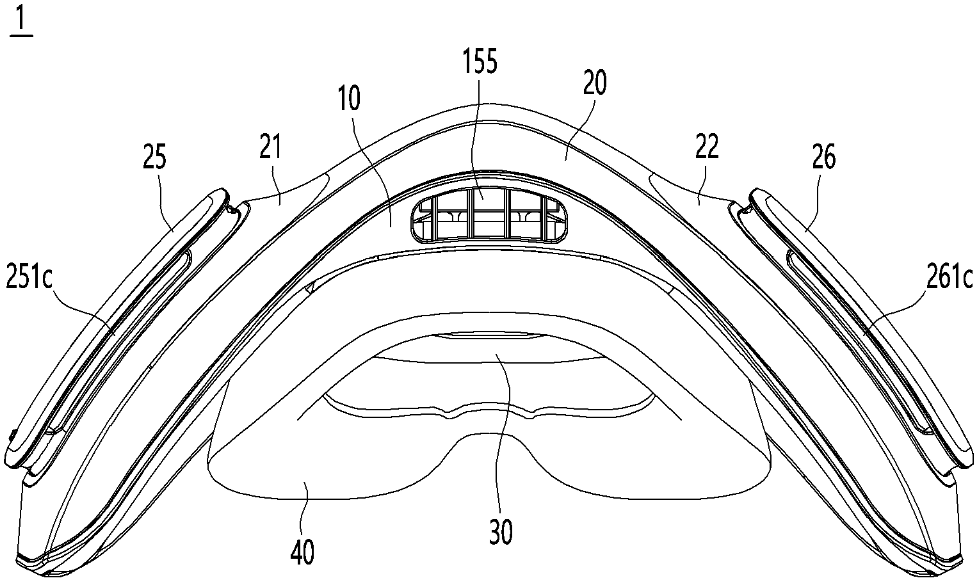
FIG. 4 is a bottom view showing the mask apparatus.

FIG. 1 is a left perspective view of a mask apparatus, FIG. 2 is a right perspective view of the mask apparatus, FIG. 3 is a rear view of the mask apparatus, and FIG. 4 is a bottom view of the mask apparatus.

Referring to FIGS. 1 to 4, a mask apparatus 1 can include a mask body 10 and a mask body cover 20 coupled to the mask body 10.

The mask body 10 and the mask body cover 20 can be detachably coupled to each other. When the mask body 10 and the mask body cover 20 are coupled to each other, an inner space can be defined between the mask body 10 and the mask body cover 20. Constituents for driving the mask apparatus 1 can be disposed in the inner space. The inner space can be defined between a front surface of the mask body 10 and a rear surface of the mask body cover 20. The mask body 10 can define a rear surface of the mask apparatus 1, and the mask body cover 20 can define a front surface of the mask apparatus 1.

A rear side of the mask apparatus 1 is defined as a direction in which the rear surface of the mask apparatus 1 facing a user's face is disposed, and a front side of the mask apparatus 1 is defined as a direction which is opposite to the rear side and in which a front surface of the mask apparatus 1, which is exposed to the outside, is disposed.

The mask apparatus 1 can further include a sealing bracket 30 and a seal 40 that is detachably coupled to the sealing bracket 30.

The sealing bracket 30 can be detachably coupled to a rear surface of the mask body 10 to fix the seal 40 to the rear surface of the mask body 10. In some examples, when the sealing bracket 30 is separated from the rear surface of the mask body 10, the seal 40 can be separated from the mask body 10.

The seal 40 can be supported on the rear surface of the mask body 10 by the sealing bracket 30, and a breathing space S for breathing can be defined between the seal 40 and the rear surface of the mask body 10. The seal 40 can be in close contact with a user's face and can surround user's nose and mouth to restrict introduction of external air into the breathing space S.

The mask body cover 20 can include a first filter mounting portion 21 and a second filter mounting portion 22. The first filter mounting portion 21 can be disposed at a right side of the mask body cover 20, and the second filter mounting portion 22 can be disposed at a left side of the mask body cover 20.

A left direction (left side) and a right direction (right side) are defined based on the mask apparatus 1 worn on the user's face. That is, in the state in which the user wearing the mask apparatus 1, a right side of the user is defined as the right side of the mask apparatus 1, and a left side of the user is defined as the left side of the mask apparatus 1.

In some examples, an upward direction (upward side) and a downward direction (downward side) are defined based on the mask apparatus 1 mounted on the user's face.

A first filter cover 25 can be mounted on the first filter mounting portion 21, and a second filter cover 26 can be mounted on the second filter mounting portion 22. Filters 23 and (see FIG. 5) can be disposed inside the first filter mounting portion 21 and the second filter mounting portion 22, and the first filter cover 25 and the second filter cover 26 can cover the filter.

The first filter cover 25 and the second filter cover 26 can be detachably coupled to the first filter mounting portion 21 and the second filter mounting portion 22, respectively. For example, the first filter cover 25 and the second filter cover 26 can be coupled to be fitted into the first filter mounting portion 21 and the second filter mounting portion 22, respectively.

Each of the first filter cover 25 and the second filter cover 26 can include a front surface portion and side surface portions extending backward along an edge of the front surface portion or an edge of a rear surface.

Each of the side surface portions of the first filter cover 25 and the second filter cover 26 can have four side surfaces, and the four side surfaces can include an upper side surface, a lower side surface, a left side surface, and a right side surface.

One or a plurality of first air inlets 251 can be defined in the side surface portion of the first filter cover 25. One or a plurality of second air inlets 261 can also be defined in the side surface portion of the second filter cover 26.

In the state in which the first filter cover 25 is mounted on the first filter mounting portion 21, the first air inlet 251 can be defined to be exposed to the outside. In the state in which the second filter cover 26 is mounted on the second filter mounting portion 22, the second air inlet 261 can be defined to be exposed to the outside.

The first air inlet 251 and the second air inlet 261 can be defined in the side surfaces of the first filter cover 25 and the second filter cover 26, respectively. In some examples, each of the first and second air inlets 251 and 261 can be respectively defined in the front surface portions of the first and second filter covers 25 and 26.

The first air inlet 251 and the second air inlet 261 can be defined at a point closer to the front surface portion from a line that bisects the side surface portion.

When a plurality of the first air inlets 251 are provided in the side surface portions of the first filter cover 25, the first air inlets 251 can include a first air suction hole **251*a* defined in the right side surface, a second air suction hole 251*b* defined in the left side surface, and a third air suction hole 251*c*** defined in the upper side surface.

Similarly, when a plurality of the second air inlets 261 are provided in the side surface portions of the second filter cover 26, the second air inlets 261 can include a first air suction hole **261*a* defined in the left side surface, a second air suction hole 261*b* defined in the right side surface, and a third air suction hole 261*c*** defined in the upper side surface.

An opening 250 can be defined in one of the first filter cover 25 and the second filter cover 26, and the opening 250 can be defined in an edge of one of the first filter cover 25 and the second filter cover 26. In some examples, a manipulation portion 195 for controlling an operation of the mask apparatus 1 can be mounted in the opening 250. In some implementations, the manipulation portion 195 can be mounted on the first filter cover 25.

The manipulation portion 195 can serve as a manipulation switch that turns on/off power of the mask apparatus 1. The manipulation portion 195 can be exposed to the front side of the mask apparatus 1 while being mounted in the opening 250.

That is, the hook mounting portion 108 can include a first hook mounting portion **108*a* provided at a right side of the mask body 10, and a second hook mounting portion 108*b* provided at a left side of the mask body 10**.

Each of the first hook mounting portion **108*a* and the second hook mounting portion 108*b* can be provided in plurality to be spaced apart from each other in a vertical direction of the mask body 10. In detail, the first hook mounting portion 108*a* can be provided at each of the upper right and lower right sides of the mask body 10, and the second hook mounting portion 108*b* can be provided at each of the upper left and lower left sides of the mask body 10**.

A band for maintaining the mask apparatus 1 in close contact with the user's face can be mounted on the hook mounting portion 108.

For example, both ends of the band can connect the first hook mounting portion **108*a* to the second hook mounting portion 108*b* or connect each of two first hook mounting portions 108*a* spaced apart from each other in the vertical direction to each of two second hook mounting portions 108*b*** spaced apart from each other in the vertical direction to each other.

In the former case, the band can have a shape surrounding the user's occipital region, and in the latter case, the band can have a shape that is hooked on both ears of the user.

The hook mounting portion 108 can be formed by cutting a portion of the mask body 10. Thus, air can be introduced into the inner space between the mask body 10 and the mask body cover 20 through a gap defined in the hook mounting portion 108.

In detail, the external air introduced into the inner space through the hook mounting portion 108 can cool electronic components disposed in the inner space. In some examples, the air of which a temperature increases while cooling the electronic components can be discharged again to the outside of the mask body 10 through the hook mounting portion 108. In some examples, to restrict a flow of the air introduced into the inner space through the hook mounting portion 108 into the breathing space, the inside of the mask apparatus 1 can have a sealing structure. In some examples, the electronic component can be or include an electronic device, an electric circuit, a battery, a controller, a fan, a memory, etc.

The mask body 10 can include an air outlet 129 for supplying the filtered air to the breathing space. The user can breathe while breathing the filtered air supplied through the air outlet 129 to the breathing space.

The air outlet 129 can include a first air outlet **129*a* through which the filtered air introduced into the first air inlet 251 is discharged to the breathing space S and a second air outlet 129*b* through which the filtered air introduced into the second air inlet 261** is discharged to the breathing space S.

The first air outlet **129*a* can be defined at a right side with respect to a center of the mask body 10, and the second air outlet 129*b* can be defined at a left side with respect to the center of the mask body 10. The air introduced through the first air inlet 251 can pass through the filter 23 and then flow to the first air outlet 129***a*. The air introduced through the second air inlet 261 can pass through the second filter 24 and then flow to the second air inlet 261.

The mask body 10 can include air exhaust holes 154 and 155 for discharging air exhaled by the user to an external space. The air exhaust holes 154 and 155 can be defined in a lower portion the mask body 10.

The air exhaust holes 154 and 155 can include a first air exhaust hole 154 defined in a front lower end of the mask body 10 and a second air exhaust hole 155 defined in a bottom surface of the mask body 10.

In detail, a rib extending forward can be formed at the front lower end of the mask body 10, and a surface defined by the rib can be defined as the bottom surface of the mask body 10.

A flow space through the air flowing toward the second air exhaust hole 155 by passing through the first air exhaust hole 154 descends can be defined between the mask body 10 and the mask body cover 20.

A check valve can be provided in one or more of the first air exhaust hole 154 and the second air exhaust hole 155. The external air can be introduced into the breathing space, or the check valve can block backflow of the air discharged through the second air exhaust hole 155. The check valve can be disposed in the flow space between the first air exhaust hole 154 to the second air exhaust hole 155.

For example, the check valve having the form of a flat flap with a size and shape corresponding to the size and shape of the first air exhaust hole 154 can be provided.

In detail, an upper end of the flap can be connected to an upper edge of the first air exhaust hole 154, and when the user exhales, the flap can be bent or rotates to open the first air exhaust hole 154, and when the user inhales, the flap can be in close contact with the first air exhaust hole 154 to help to prevent the external air or the discharged air from being introduced again into the breathing space.

The mask body 10 can include a sensor mounting portion 109. The sensor mounting portion 109 can be equipped with a sensor for acquiring various pieces of information from the breathing space. The sensor mounting portion 109 can be disposed above the mask body 10. When the user breathes, the sensor mounting portion 109 can be disposed above the mask body 10 in consideration of a position at which a pressure change in the breathing space is constantly sensed.

The mask body 10 can include a connector hole 135. The connector hole 135 can be understood as an opening in which a connector for supplying power to the mask apparatus 1 is installed. The connector hole 135 can be defined at either a left edge or a right edge of the mask body 10.

In some implementations, where the manipulation portion 195 and the connector are connected to a power module 19 (see FIG. 5) to be described later, the connector hole 135 can be provided at one side of the left or the right side of the mask body 10, which corresponds to the position at which the power module 19 is installed.

Hereinafter, constituents of the mask apparatus 1 will be described in detail based on an exploded perspective view.

Figure 5:
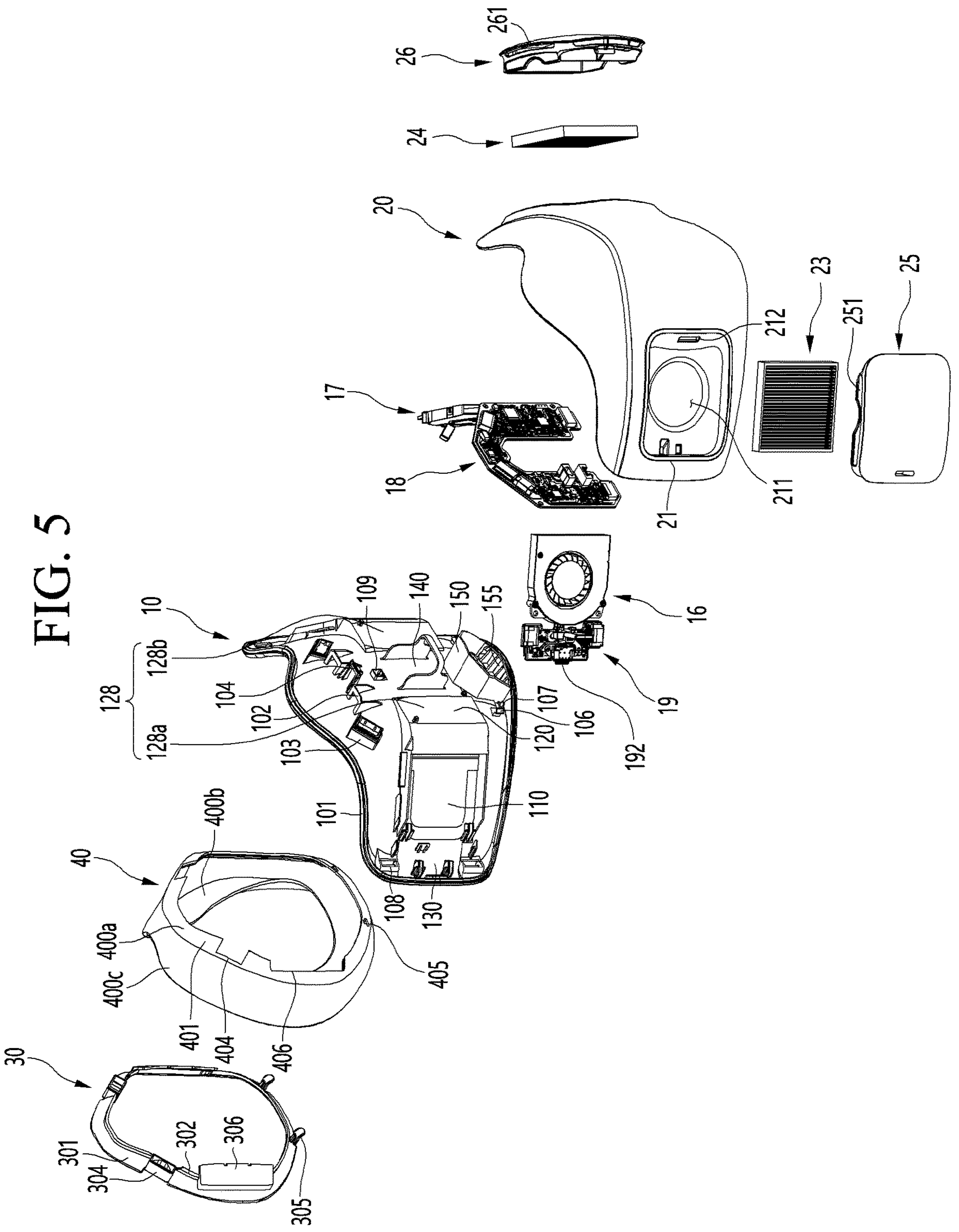
FIG. 5 is an exploded perspective view showing the mask apparatus.

FIG. 5 is an exploded perspective view of the mask apparatus.

Referring to Fog. 5, the mask apparatus 1 can include the mask body 10, the mask body cover 20, the sealing bracket 30, and the seal 40.

In detail, the mask body 10 and the mask body cover 20 can be coupled to each other to form an outer appearance of the mask apparatus 1.

An inner space for accommodating devices for the operation of the mask apparatus 1 can be defined between the mask body 10 and the mask body cover 20. The sealing bracket 30 and the seal 40 are coupled to the rear surface of the mask body 10 to define the breathing space between the user's face and the mask body 10. The sealing bracket 30 and the seal 40 can help to prevent the external air from being introduced into the breathing space.

The mask body 10 can include a cover coupling groove 101. The cover coupling groove 101 can be defined along a front edge of the mask body 10. The cover coupling groove 101 can be defined by a height difference. The cover coupling groove 101 can be defined to correspond to an edge of the mask body cover 20. The cover coupling groove 101 can be defined by recessing a portion of the front surface of the mask body 10 backward. The mask body cover 20 can move toward the cover coupling groove 101 of the mask body 10 to allow the mask body cover 20 to be inserted into the cover coupling groove 101.

The mask body 10 can include a first cover coupling portion 102. An upper portion of the mask body cover 20 can be supported on the first cover coupling portion 102. The first cover coupling portion 102 can be disposed on a front upper portion of the mask body 10.

For example, the first cover coupling portion 102 can have a structure that is capable of being hook-coupled. The hook coupled to the first cover coupling portion 102 can be disposed on a rear surface of the mask body cover 20.

The first cover coupling portion 102 can be provided in plurality, and the hook can also be provided in plurality to correspond to the first cover coupling portions 102. In some implementations, the first cover coupling portion 102 can be provided at the left and right sides of the mask body 10 based on the center of the mask body 10, respectively. The first cover coupling portion 102 can be referred to as an upper cover coupling portion.

The mask body 10 can include a first bracket coupling portion 103. The first bracket coupling portion 103 can be disposed above the mask body 10. The first bracket coupling portion 103 can support an upper portion of the sealing bracket 30.

The first bracket coupling portion 103 can be disposed above a rear surface of the mask body 10.

For example, the first bracket coupling portion 103 can be provided by allowing a portion constituting the mask body 10 to protruding forward from the rear surface of the mask body 10. Thus, the first bracket coupling portion 103 can be understood as a recess when viewed from a rear side of the mask body 10 and a protrusion when viewed from a front side of the mask body 10.

The sealing bracket 30 can include a first body coupling portion 304 that has the same shape as the recessed shape of the first bracket coupling portion 103 and is seated on the first bracket coupling portion 103.

The first bracket coupling portion 103 can be provided at each of the left and right sides of the mask body 10. The first bracket coupling portion 103 can be defined as an upper bracket coupling portion.

The mask body 10 can include a support rib 104.

The support rib 104 can be provided to protrude forward from the front surface of the mask body 10. The support rib 104 can contact the rear surface of the mask body cover 20 when the mask body cover 20 is coupled to the mask body 10.

The mask body 10 and the mask body cover 20 can resist external forces acting in a front and rear direction by the support rib 104. The support ribs 104 can be provided in a plurality on the front surface of the mask body 10.

The support rib 104 can perform a function of fixing a portion of the control module 18 mounted on the mask body 10. For this, the support rib 104 can include a hook shape. In other words, a hook protrusion can protrude from an end of the support rib 104 to fix the end of the control module 18.

The mask body 10 can include a second cover coupling portion 106.

A lower portion of the mask body cover 20 can be supported on the second cover coupling portion 106. The second cover coupling portion 106 can protrude in a hook shape from a front lower end of the mask body 10. The first cover coupling portion 102 can be provided at each of the left and right sides of the mask body 10 based on the center of the mask body 10. The second cover coupling portion 106 can be defined as a lower cover coupling portion.

A hook hooking portion to which the second cover coupling portion 106 is coupled can be disposed on the mask body cover 20, and the hook hooking portion can be disposed at each of left and right sides of the mask body cover 20.

The mask body 10 can include the second bracket coupling portion 107. A lower portion of the sealing bracket 30 can be supported on the second bracket coupling portion 107. The second bracket coupling portion 107 can be provided by opening the mask body 10. The second bracket coupling portion 107 can be disposed in a lower portion of the mask body 10. For example, the second bracket coupling portion 107 can be provided as a through-hole defined in the mask body 10.

A second body coupling portion 305 coupled to the second bracket coupling portion 107 can be disposed on the sealing bracket 30. The second bracket coupling portion 107 can be provided in plurality, and the second body coupling portion 305 can also be provided in plurality to correspond to the second bracket coupling portions 107. In some implementations, the second bracket coupling portion 107 can be provided at each of the left and right sides with respect to the center of the mask body 10. The second bracket coupling portion 107 can be defined as a lower bracket coupling portion.

The mask body 10 can include the above-described sensor mounting portion 109.

The sensor mounting portion 109 can have a rib shape in which a portion of the front surface of the mask body 10 protrudes forward. In detail, the sensor mounting portion 109 has a rib shape that is surrounded along an edge of the sensor, and an installation space in which the sensor is installed is defined in the sensor mounting portion 109.

A hole through which the installation space and the breathing space communicate with each other is defined in the mask body 10 corresponding to the inside of the sensor mounting portion 109. The sensor disposed in the installation space can include a pressure sensor, and the pressure sensor can sense pressure information of the breathing space through the hole.

The mask body 10 can include a fan module mounting portion 110.

The fan module mounting portion 110 can include a first fan module mounting portion on which a first fan module 16 is mounted and a second fan module mounting portion on which a second fan module 17 is mounted.

The first fan module mounting portion and the second fan module mounting portion can be disposed on the front surface of the mask body 10. In detail, the first fan module mounting portion can be disposed at the right side of the mask body 10, and the second fan module mounting portion can be disposed at the left side of the mask body 10.

The first fan module 16 and the second fan module 17 can be detachably coupled to the first fan module mounting portion and the second fan module mounting portion, respectively.

The mask body 10 can include an air duct 120.

The air duct 120 can be disposed on the front surface of the mask body 10. A passage through which air passes can be provided in the air duct 120.

The air duct 120 can include a first air duct 120*a* connected to the first fan module mounting portion and a second air duct 120*b* connected to the second fan module mounting portion.

The first air duct 120*a* and the second air duct 120*b* can be disposed on an edge of the first fan module mounting portion and an edge of the second fan module mounting portion, which are adjacent to the center of the front surface of the mask body 10 so as to be disposed between the first fan module mounting portion and the second fan module mounting portion.

In some examples, the first fan module mounting portion and the second fan module mounting portion can have a shape symmetrical with respect to a vertical plane (or a vertical line) passing through the center of the front surface of the mask body 10. Similarly, the first air duct and the second air duct can also have a shape symmetrical with respect to the vertical plane or the vertical line passing through the center of the front surface of the mask body 10.

One end of the air duct 120 communicates with the outlets of the fan modules 16 and 17 to allow the external air to be introduced into the air duct 120. In addition, the other end of the air duct 120 communicates with the air outlet 129 so that the air introduced into the air duct 120 is discharged into the breathing space S.

A control module 18 can be mounted on the front surface of the air duct 120.

A control module mounting portion 128 for mounting the control module 18 can be disposed on the front surface of the air duct 120. A portion of the front surface of the air duct 120 can be provided as a flat portion on which the control module 18 is capable of being seated, and the flat portion can be defined as the control module mounting portion 128.

The control module mounting portion 128 can include a first control module mounting portion 128*a* provided in the first air duct and a second control module mounting portion 128*b* provided in the second air duct. One control module 18 can be fixed to the first control module mounting portion 128*a* and the second control module mounting portion 128*b*, or a plurality of control modules can be respectively fixed to the first and second control module mounting portions 128*a* and 128*b*.

The mask body 10 can include a power module mounting portion 130 for mounting the power module 19.

The power module mounting portion 130 can be disposed on the front surface of the mask body 10. The power module mounting portion 130 can be provided at one of the left and the right side of the mask body 10.

The power module mounting portion 130 can be disposed at the side of the fan module mounting portion 110. Specifically, the power module mounting portion 130 can be provided between the fan module mounting portion 110 and a side end of the mask body 10. The side end of the mask body 10 can be defined as an end adjacent to the user's ear when worn. In some examples, a connector hole 135 can be defined in the side end of the mask body 10 provided with the power module mounting portion 130.

The mask body 10 can include a battery mounting portion 140 configured to mount a battery. In some examples, the mask body 10 can include the battery mounted in the battery mounting portion 140.

The battery mounting portion 140 can be disposed at the front surface of the mask body 10. The battery mounting portion 140 can protrude forward from the front surface of the mask body 10 so as to surround at least a portion of the battery.

In some examples, the mask body 10 can be configured to receive a battery at a center region of the front surface of the mask body 10. For example, the battery mounting portion 140 can be located at a center region or a central area of the mask 10. The center region or central area can include a center of the mask body 10 in a lateral direction (e.g., a left-right direction). In some cases, the center region can extend to one or both sides of the center of the mask body 10 in the lateral direction.

In some implementations, the battery mounting portion 140 can include a pair of guide ribs protruding forward from the front surface of the mask body 10 and a connection rib connecting front ends of the pair of guide ribs to each other. In some examples, the battery can be mounted in a battery accommodation space defined by the pair of guide ribs and the connection rib.

The battery can move downward from an upper side of the battery accommodating space and be inserted into the battery accommodating space and then can move in a reverse direction to be separated. A lower portion of the battery inserted into the battery mounting portion 140 can be supported by an air discharge portion 150 that defines an air outlet.

The mask body 10 can include the air discharge portion 150.

The air discharge portion 150 can be disposed in a lower portion of the mask body 10. The air discharge portion 150 can define a flow space through which the air flowing from the first air exhaust hole 154 toward the second air exhaust hole 155 passes.

The air discharge portion 150 can protrude forward from the front surface of the mask body 10. In some examples, the air discharge portion 150 can extend to be rounded in an arch shape or can be bent several times to extend.

When the mask body cover 20 is coupled to the mask body 10, a front end of the air discharge portion 150 can be in contact with the rear surface of the mask body cover 20, and the inner space of the mask body 10 and the flow space can be distinguished from each other. The air discharge portion 150 can define a top surface and both side surfaces of the flow space, and a rear surface of the mask body cover 20 can define a front surface of the flow space. In some examples, the front surface of the mask body 10 can define a rear surface of the flow space, and the bottom surface of the mask body 10 on which the second air exhaust hole 155 is defined can define a bottom surface of the flow space.

The top surface of the air discharge portion 150 can support a lower end of the battery. It is connected to lower ends of both sides of the air discharge portion 150 having the arch shape or tunnel shape can be connected to the bottom surface of the mask body 10, and the bottom surface of the mask body 10 can be defined by the rib extending forward from the lower end of the front surface of the mask body 10. The cover coupling groove 101 is recessed along the front end of the rib defining the bottom surface of the mask body 10, and the lower end of the rear surface of the mask body cover 20 is coupled to the cover coupling groove 101.

The first air exhaust hole 154 can be defined in the front surface of the mask body 10 defining the rear surface of the flow space.

The mask body cover 20 can include a pair of filter mounting portions 21 and 22, as described above.

The filter mounting portions 21 and 22 can be provided by recessing the front surface of the mask body cover 20 to be recessed by a predetermined depth toward the rear surface of the mask body cover 20. Filters 23 and 24 are accommodated inside the filter mounting portions 21 and 22 provided by being recessed, and filter covers 25 and 26 can be mounted on edges of the filter mounting portions 21 and 22 in the state in which the filters 23 and 24 are accommodated.

Air suction ports 211 and 221 can be defined in the filter mounting portions 21 and 22. The air suction ports 211 and 221 can communicate with suction holes defined in the front surfaces of the fan modules 16 and 17, respectively. Each of edges of the air suction ports 211 and 221 can have an inclined surface that inclined in a direction in which a diameter gradually decreases from the front surface to the rear surface.

A filter cover mounting groove 212 for fixing each of the filter covers 25 and 26 can be defined in a side surface of each of the filter mounting portions 21 and 22. A coupling protrusion inserted into the filter cover mounting groove 212 and 222 can be disposed on each of the filter covers 25 and 26. In FIG. 5, only the coupling protrusion 262 disposed on the left filter cover 26 is illustrated, but it is noted that the same coupling protrusion is disposed on the right filter cover 25 as well.

In some implementations, a sealing material for sealing can be provided between the edges of the rear surfaces of the air suction ports 211 and 221 of the filter mounting portions 21 and 22 and the fan inlets of the fan modules 16 and 17. The sealing material can surround the air suction ports 211 and 221 and edges of the fan inlets of the fan modules 16 and 17 to block introduction of the external air.

The filter mounting portions 21 and 22 include a first filter mounting portion 21 provided at the right side of the mask body cover 20 and a second filter mounting portion 22 provided at the left side of the mask body cover 20.

The air suction hole defined in the first filter mounting portion 21 can be defined as a first air suction port 211, and the air suction hole defined in the second filter mounting portion 22 can be defined as a second air suction port 221.

The filters 23 and 24 can include a first filter 23 accommodated inside the first filter mounting portion 21 and a second filter 24 accommodated inside the second filter mounting portion 22.

The filter covers 25 and 26 can include a first filter cover 25 mounted on the first filter mounting portion 21 and a second filter cover 26 mounted on the second filter mounting portion 22. A plurality of first air inlets 251 can be defined in the first filter cover 25 to allow the external air to be introduced, and a plurality of second air inlets 261 can be defined in the second filter cover 26 to allow the external air to be introduced.

The control module 18 can be referred to as a first electronic circuit device, and the power module 19 can be referred to as a second electronic circuit device.

The fan modules 16 and 17 can include a fan, a fan motor, and a fan housing accommodating the fan and the fan motor. The fan housing can include a suction hole through which the air is introduced into the fan, and a discharge hole through which the air forcedly flowing by the fan is discharged.

The fan may include various types of fans. For example, the fan can include a centrifugal fan that suctions air from the front side of the mask body cover 20 and discharges the air to the side of the mask body 10. In some examples, the fan can include an axial fan or a cross flow fan.

The air introduced through the first air inlet 251 to pass through the first filter 23 is suctioned through the first air suction port 211. In some examples, the air introduced through the second air inlet 261 to pass through the second filter 24 is suctioned through the second air suction port 221.

The fan outlet of the first fan module 16 can communicate with the first air duct to discharge the air to the breathing space, and the fan outlet of the second fan module 17 can communicate with the second air duct to discharge the air to the breathing space.

The control module 18 can control an operation of the mask apparatus 1. The control module 18 can be fixed to the control module mounting portion 128.

The control module 18 can include a communication module to transmit and receive various types of information. The control module 18 can include a data storage module to store various types of information.

The control module 18 can control an operation of each of the fan modules 16 and 17. In detail, the control module 18 can control the operation of each of the fan modules 16 and 17 based on information sensed from the sensor.

The control module 18 can be electrically connected to the power module 19, the fan modules 16 and 17, and the battery so as to be interlocked with each other.

The power module 19 can receive power from the outside. The power module 19 can include a charging circuit for charging the battery. The power module 19 can include the connector 192 and the manipulation portion 195. Thus, the control module 18 can operate by receiving battery power or external power through the connector 192.

The power module 19 can control supply of power to the mask apparatus 1 by the manipulation portion 195. In detail, the power module 19 can control supply of power from the battery to the control module 18 and the fan modules 16 and 17.

The seal 40 can be coupled to the rear surface of the mask body 10 by the sealing bracket 30 to be in close contact with the user's face.

The rear surface of the mask body 10 can be to be spaced apart from the user's face by the seal 40.

The sealing bracket 30 can be provided in a ring shape forming a closed loop. The seal 40 can be detachably coupled to the sealing bracket 30.

In some examples, the sealing bracket 30 is coupled to be detachable from the mask body 10 to separate the sealing bracket 30 from the mask body 10. With this structure, only the sealing bracket 30 is separated, or an assembly of the seal 40 and the sealing bracket 30 is separated from the mask body 10 to clean only sealing bracket 30 or clean both the sealing bracket 30 and the seal 40.

After the seal 40 is coupled to the sealing bracket 30, when the sealing bracket 30 is coupled to the mask body 10, the seal 40 is stably fixed to the mask body 10.

The sealing bracket 30 can include a sealing insertion portion 301 inserted into an inner edge of the seal 40.

Figure 13:
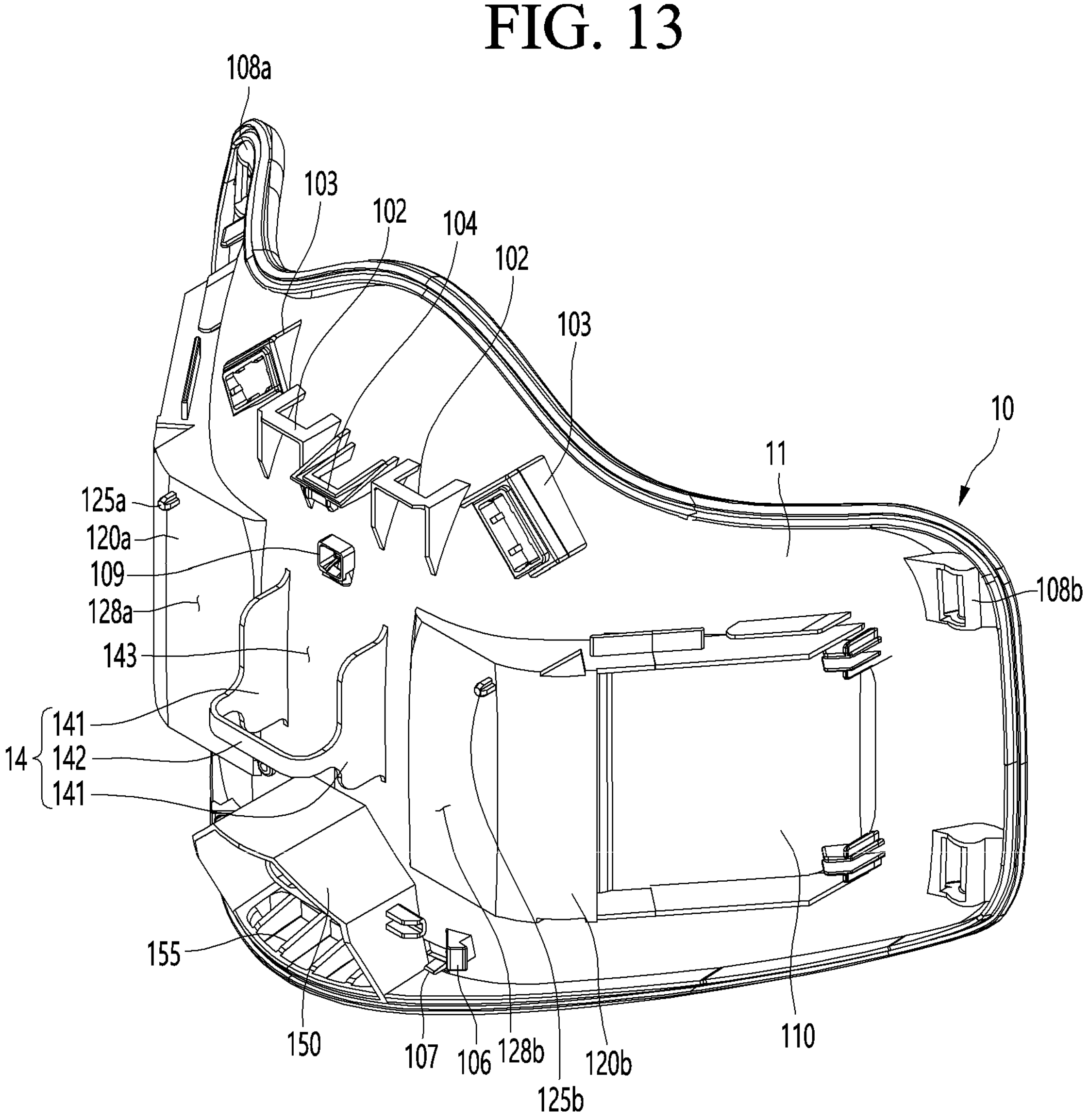
FIG. 13 is a left perspective view showing an example of a mask body.

The inner edge of the seal 40 can be provided in a shape of seal lips that is branched into two portions, and the sealing insertion portion 301 can be inserted into the seal lips (see FIG. 13).

The sealing insertion portion 301 can have a cross-sectional shape having a constant thickness or a cross-sectional shape of which a thickness decreases from an inner edge toward an outer edge. A body of the sealing bracket 30 can be provided by the sealing insertion portion 301 and a fixing guide 302 to be described later.

The sealing bracket 30 can include the fixing guide 302.

The fixing guide 302 can be bent at an inner end of the sealing insertion portion 301. When the sealing insertion portion 301 is completely inserted into the seal lips of the seal 40, one of the two seal lips is in contact with the fixing guide 302. That is, when the inner edge of the seal 40 is in contact with the fixing guide 302, it is seen that the seal 40 is completely coupled to the sealing bracket 30.

The sealing bracket 30 can include a bracket insertion portion 306 coupled to the mask body 10. The bracket insertion portion 306 is inserted into a cutoff portion defined in the rear surface of the mask body 10 to cover a portion of an edge of the cutoff portion.

The cutoff portion can be understood as an opening communicating with the air duct 120 so that the air passes therethrough. The bracket insertion portion 306 can be disposed on one edge of the cutoff portion, specifically, an outer edge.

The air outlet 129 already described can be understood as the remaining portion of the cutoff portion that is not covered by the bracket insertion portion 306 in a state in which the bracket insertion portion 306 is inserted into one side of the cutoff portion.

When the bracket insertion portion 306 is inserted into or coupled to the one side of the cutoff portion to shield the one side of the cutoff portion, the air discharged from the fan modules 16 and 17 can pass between the air duct 120 and the bracket insertion portion 306 to flow to the air outlet 129.

The bracket insertion portion 306 can serve as a function of fixing the sealing bracket 30 to the mask body 10 while defining one surface of the air duct 120. In detail, an upper portion of the sealing bracket 30 can be fixed to the upper portion of the mask body 10 by the first body coupling portion 304, a lower portion of the sealing bracket 30 can be fixed to the lower portion of the mask body 10 by the second body coupling portion 305, and an intermediate portion of the sealing bracket 30 can be fixed to an intermediate portion of the mask body 10 by the bracket insertion portion 306.

The seal 40 can be made of a material having elasticity. The seal 40 can be in close contact with the user's face and deformed to correspond to an outline of the user's face. The seal 40 can be provided in a ring shape forming a closed loop. The seal 40 can be provided to cover the user's nose and mouth.

The seal 40 includes a coupling portion 400*a* coupled to the mask body 10, a side surface portion 400*c* extending from the coupling portion 400*a* toward the user's face, and a contact portion 400*b* that is bent from an end of the side surface portion 400*c* to extend toward the coupling portion 400*a*.

The contact portion 400*b* can be a portion that is in close contact with the user's face, and the side surface portion 400*c* and the contact portion 400*b* can be angled at an angle of about 90 degrees or less to define a space between the side surface portion 400*c* and the contact portion 400*b*.

A first opening can be defined inside the coupling portion 400*a* of the seal 40, and a second opening can be defined inside the contact portion 400*b*. As illustrated in FIG. 3, the second opening can include a main opening in which the front of the user's nose and mouth are disposed and a sub opening extending from an upper end of the main opening and disposed on the user's nose.

In some examples, a lower portion of the main opening, that is, a portion that is in close contact with the front of the user's jaw can be designed closer to the mask body 10 than a portion that is in close contact with the front of the user's cheek.

In some implementations, a plurality of ventilation holes can be defined in the contact portion 400*b* to minimize a phenomenon in which moisture is generated on the user's cheek. The plurality of ventilation holes can have different sizes. For example, a diameter of the ventilation hole can gradually increase from an inner edge to an outer edge of the contact portion 400*b*.

The air outlet 129 and the air exhaust holes 154 and 155 can be provided inside the first opening, and the user's nose and mouth can be disposed inside the second opening.

The seal 40 is disposed between the user's face and the mask body 10, and the breathing space S is defined by the coupling portion 400*a*, the contact portion 400*b*, and the inner side of the side surface portion 400*c* of the seal 40.

A bracket insertion groove 401 can be defined in an end of the coupling portion 400*a* of the seal 40.

The bracket insertion groove 401 can be understood as a groove or a space defined between the two seal lips when the coupling portion 400*a* has the shape that is branched into the two seal lips as described above, and the bracket insertion portion 305 of the sealing bracket 30 is inserted into the bracket insertion groove 401.

The seal 40 includes a first seating portion 404 on which the first body coupling portion 304 is seated, a second seating portion 405 on which the second body coupling portion 305 is seated, and a third seating portion 406 on which the bracket insertion portion 306 is seated.

The first and third seating portions 404 and 406 can be understood as grooves in which a portion of the seal 40 is cut to form an accommodation space in which the first body coupling portion 304 and the bracket insertion portion 306 are accommodated. In some examples, the second seating portion 405 can be understood as a hole in which a portion of the seal 40 is cut to pass through the second body coupling portion 305.

In another aspect, the first mounting portion 404 can be defined as a first opening, the second mounting portion 405 can be defined as a second opening, and the third mounting portion 406 can be defined as a third opening.

Figure 6:
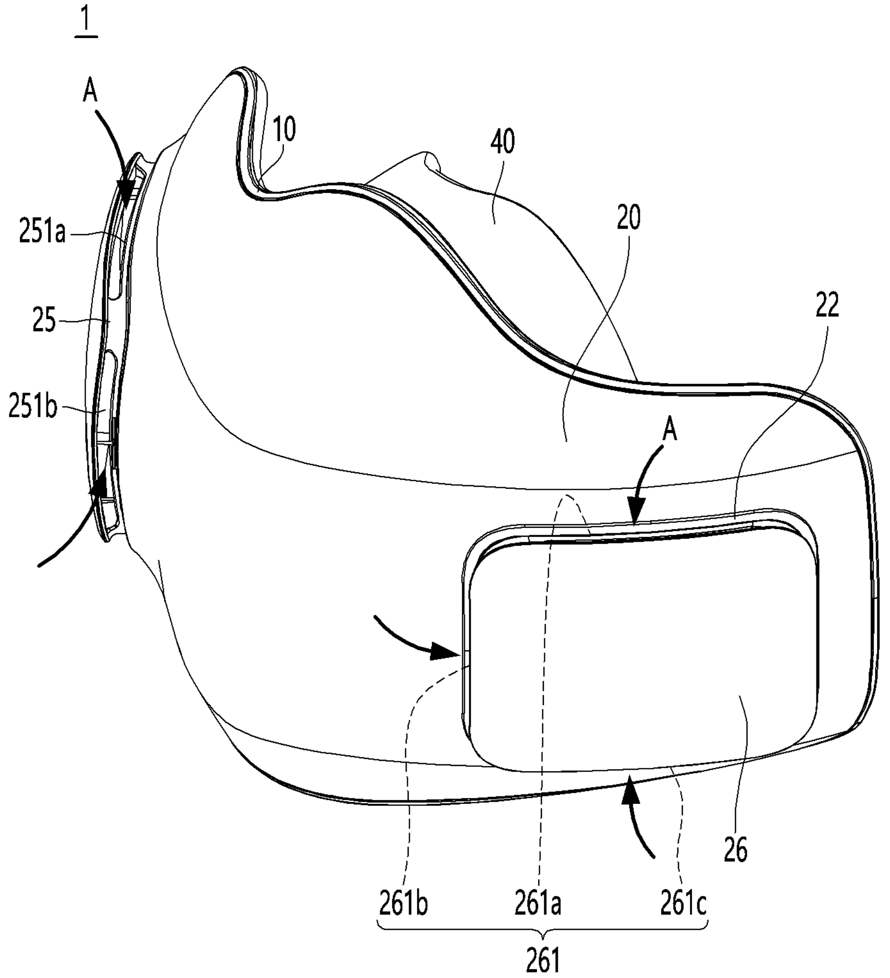
FIGS. 6 and 7 are views illustrating an example of a flow of air when the mask apparatus operates.
Figure 7:
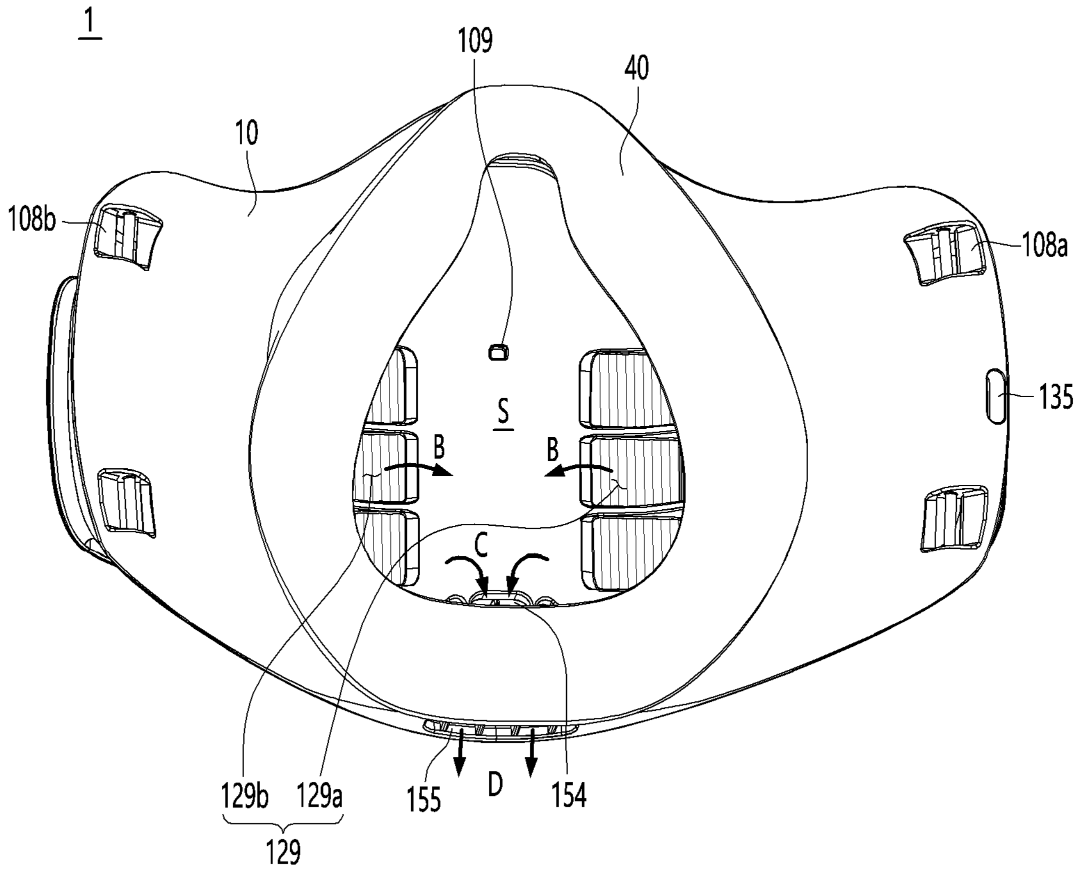

FIGS. 6 and 7 are views illustrating a flow of air when the mask apparatus operates.

Referring to FIGS. 6 and 7, the mask apparatus 1 can suction the external air through the air inlets 251 and 261 provided in the filter covers 25 and 26. The flow direction of the external air suctioned into the mask apparatus 1 is indicated by an arrow "A" Since the air inlets 251 and 261 are provided in plurality to suction the air in various directions, an inflow rate of the external air increases.

For example, the air inlets 251 and 261 can include air inlets 251*a* and 261*a* for suctioning air flowing at upper sides of the filter covers 25 and 26, air inlets 251*b* and 261*b* for suctioning air flowing at a front side of the filter covers 25 and 26, and air inlets 251*c* and 261*c* for suctioning air flowing at a lower side of the filter covers 25 and 26. The side air inlets 251*b* and 261*b* can be provided at one or both sides of the left and right sides of the filter covers 25 and 26.

Since the filter covers 25 and 26 in which the air inlets 251 and 261 are provided are respectively disposed at left and right sides of the front surface of the mask apparatus 1, the external air can be smoothly suctioned from the left and right sides of the front surface of the mask apparatus 1.

The external air introduced through the air inlets 251 and 261 can be filtered by passing through the filters 23 and 24 disposed inside the filter mounting portions 21 and 22. The filters 23 and 24 can be replaced when the filter covers 25 and 26 are separated from the mask apparatus 1.

The air passing through the filters 23 and 24 can be introduced into the suction holes of the fan modules 16 and 17 through the air suction ports 211 and 221. In some examples, the filter mounting portions 21 and 22, in which the air suction ports 211 and 221 are defined, and the fan modules 16 and 17 are assembled in the state of being in close contact with each other. The air can pass through the filter without leakage, and the external air may not enter between the filter mounting portions 21 and 22 and the fan modules 16 and 17.

The air discharged through the fan outlets of the fan modules 16 and 17 can pass through the air duct 120 to flow into the breathing space S through the air outlet 129. A flow direction of the air introduced into the breathing space S through the air outlet 129 is indicated by an arrow "B"

The breathing space S can be defined by the mask body 10 and the seal 40. When the mask body 10 is in close contact with the user's face, the seal 40 can be in close contact with the mask body 10 and the user's face to form an independent breathing space that is separated from the external space.

The user inhales after suctioning the filtered air supplied through the air outlet 129 can be exhausted to the external space through the air exhaust holes 154 and 155.

As described above, the air exhaust holes 154 and 155 include a first air exhaust hole 154 communicating with the breathing space and a second air exhaust hole 155 communicating with the external space, and the first air exhaust hole 154 and the second air exhaust hole 155 can communicate with each other by the flow space defined by the air discharge portion 150. The air exhaled by the user can be guided into the flow space through the first air exhaust hole 154. A flow direction of the air flowing into the flow space through the first air exhaust hole 154 is indicated by an arrow "C"

The air guided into the flow space through the first air exhaust hole 154 can be discharged to the external space through the second air exhaust hole 155. A flow direction of the air flowing to the external space through the second air exhaust hole 155 is indicated by an arrow "D".

Figure 8:
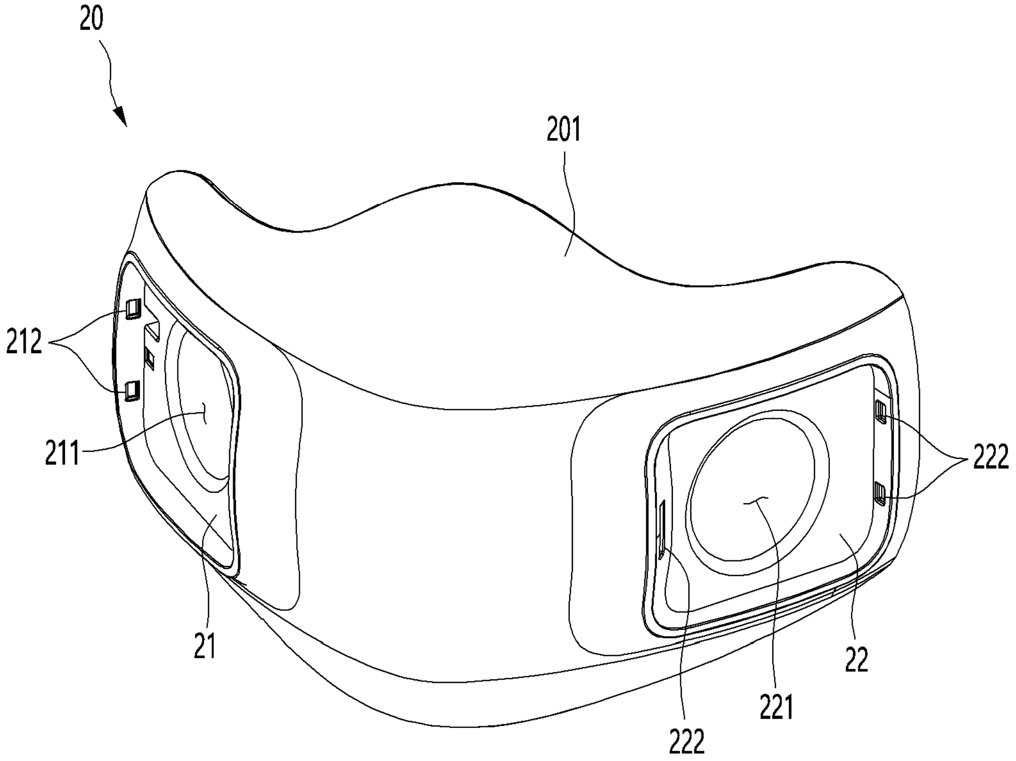
FIG. 8 is a front perspective view showing an example of a mask body cover.
Figure 9:
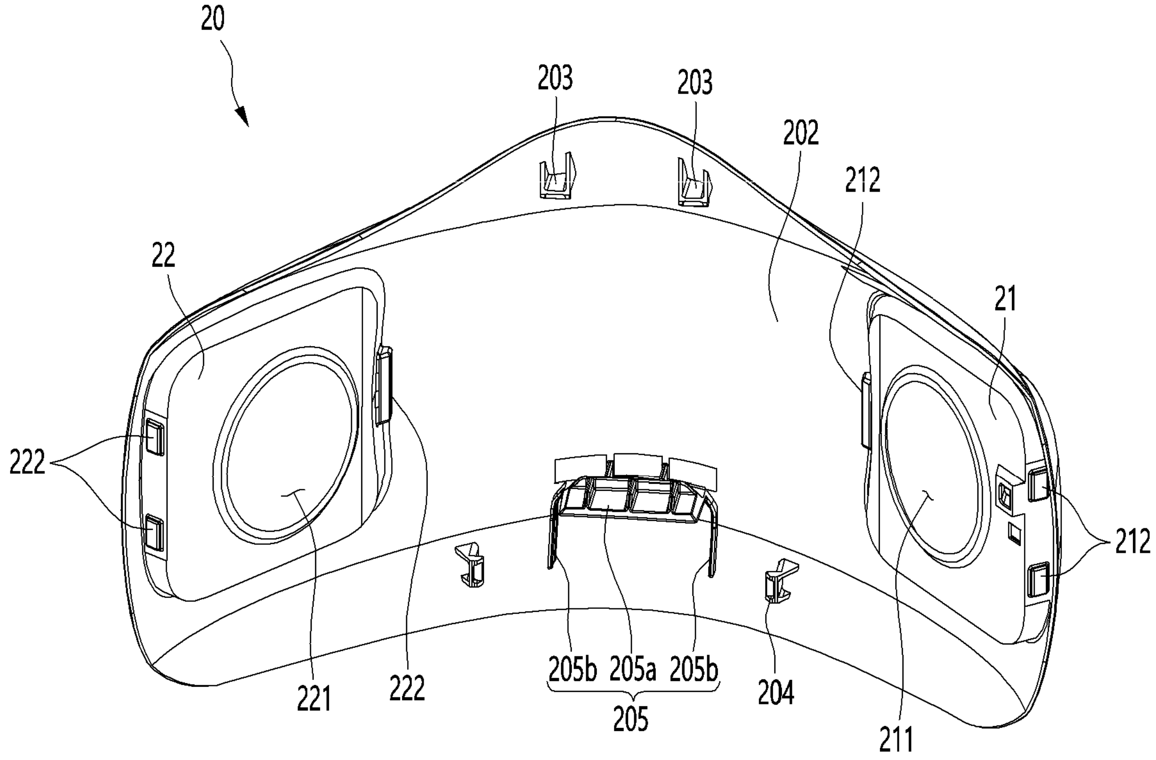
FIG. 9 is a rear perspective view showing the mask body cover.

FIG. 8 is a front perspective view of the mask body cover, and FIG. 9 is a rear perspective view of the mask body cover.

Referring to FIGS. 8 and 9, the mask body cover 20 can be coupled to the front of the mask body 10. The mask body cover 20 can be provided to be elongated in the left and right direction, and a center portion of the mask body cover 20 can be convexly rounded forward. In some examples, the mask body cover 20 can be provided to be symmetrical to each other in the left and right direction with respect to a vertical surface passing through a center of the front surface thereof.

The mask body cover 20 can include a cover front surface 201 defining an outer surface or a front surface thereof, and a cover rear surface 202 defining an inner surface or a rear surface thereof.

The cover front surface 201 can be a portion that is exposed to the outside to define an outer appearance thereof when the user wears the mask apparatus 1. The cover front surface 201 can include a first filter mounting portion 21 on which the first filter 23 is mounted and a second filter mounting portion 22 on which the second filter 24 is mounted.

The first filter mounting portion 21 and the second filter mounting portion 22 can be provided to be symmetrical to each other in the left and right direction with respect to the center of the front surface 201 of the cover. The first filter mounting portion 21 and the second filter mounting portion 22 can have the same or similar shape to each other.

In some implementations, the first filter mounting portion 21 and the second filter mounting portion 22 can be provided by partially recessing the front surface 201 of the cover. For example, in the first filter mounting portion 21 and the second filter mounting portion 22, a portion of the front surface 201 of the cover can be recessed backward to define a space in which the first filter 23 and the second filter 24 are seated.

Thus, each of the first filter mounting portion 21 and the second filter mounting portion 22 can have a bottom surface, on which the first filter 23 and the second filter 24 contact and are supported, and a plurality of side surfaces defining edges of the bottom surface.

A first air suction port 211 through which external air is suctioned can be defined in the bottom surface of the first filter mounting portion 21. The air passing through the first filter 23 can be suctioned into the first fan module 16 through the first air suction port 211.

The first air suction port 211 can be disposed at a center of the bottom surface. For example, the first air suction port 211 can be provided to be opened in a circular shape.

At least one or more first filter cover mounting grooves 212 for mounting the first filter cover 25 can be defined in the side surfaces of the first filter mounting portion 21.

The first filter cover mounting groove 212 can be defined by being further recessed inward from the side surface of the first filter mounting portion 21. Thus, the coupling protrusion 262 protruding from the edge of the first filter cover 25 can be fitted and coupled to the first filter cover mounting groove 212 and then be mounted on the first filter mounting portion 21.

In some implementations, the first filter cover mounting groove 212 can be defined in each of two side surfaces of the first filter mounting portion 21 facing each other. In detail, the first filter cover mounting groove 212 can include one or a plurality of mounting grooves defined in one of the two side surfaces facing each other and one or a plurality of mounting grooves defined in the other of the two side surfaces.

In some implementations, at least one of the side surfaces of the first filter mounting portion 21, i.e., one of the two side surfaces, in which the first filter cover mounting groove is defined, can be provided to be inclined. For example, among the side surfaces of the first filter mounting portion 21, a side adjacent to a front center of the filter cover 25 can be provided to be gradually inclined in a direction that is close to the front center of the filter cover 25 toward the front surface of the filter cover 25.

The reason in which at least one of the side surfaces of the first filter mounting portion 21 is provided to be inclined is to facilitate detachment of the first filter cover 25. That is, when the side in which the first filter cover mounting groove 212 is defined is provided to be inclined, in a state in which the coupling protrusion 262 protruding from one side end of the first filter cover 25 is inserted into the first filter cover mounting groove 212, the coupling protrusion 262 can be inserted into the first cover mounting portion 21 while the other side end of the first filter cover 25 is slid along the inclined side surface. The first cover mounting portion 21 can define a groove.

Similarly, a second air suction port 221 through which external air is suctioned can be defined in the bottom surface of the second filter mounting portion 22. The air passing through the second filter 24 can be suctioned into the second fan module 17 through the second air suction port 221.

The second air suction port 221 can be disposed at a center of the bottom surface. For example, the second air suction port 221 can be provided to be opened in a circular shape.

At least one or more second filter cover mounting grooves 222 for mounting the second filter cover 26 can be defined in side surfaces of the second filter mounting portion 22.

Since the second filter mounting portion 22 has a shape that is symmetrical to the shape of the first filter mounting portion 22, duplicated descriptions of the second filter mounting portion 22 will be omitted.

The cover rear surface 202 is coupled to cover the entire surface of the mask body 10 and serves to protect a plurality of devices mounted on the mask body 10.

A plurality of coupling ribs for coupling to the mask body 10 can be disposed on the rear surface 202 of the cover. The plurality of coupling ribs can be provided to protrude backward from the cover rear surface 202.

The plurality of coupling ribs can include a first coupling rib 203 provided above the cover rear surface 202 and a second coupling rib 204 provided below the cover rear surface 202.

The first coupling rib 203 can be disposed above the cover rear surface 202, and the second coupling rib 204 can be disposed below the cover rear surface 202.

The first coupling rib 203 can be fitted and coupled to the first cover coupling portion 102 provided on the mask body 10. The first coupling ribs 203 can be provided in plurality so as to be spaced apart from an upper portion of the cover rear surface 202 to both sides.

The second coupling rib 204 can be fitted and coupled to the second cover coupling portion 106 provided on the mask body 10. The second coupling ribs 204 can be plurality in plurality so as to be spaced apart from an upper portion of the cover rear surface 202 to both sides.

In this case, an interval between the plurality of second coupling ribs 204 can be greater than that between the plurality of first coupling ribs 203.

The plurality of coupling ribs can further include a third coupling rib 205 provided under the cover rear surface 202. The third coupling rib 205 can be fitted and coupled to the air outlet 150 provided in the mask body 10. The third coupling rib 205 can be provided between the plurality of second coupling ribs 204.

The third coupling rib 205 includes a horizontal rib 205*a* protruding horizontally backward from the cover rear surface 202 and a vertical rib 205*b* extending downward from both sides of the horizontal rib 205*a*.

Here, the air outlet 150 can be coupled to surround outer edges of the horizontal rib 205*a* and the vertical rib 205*b*. In detail, at least a portion of the third coupling rib 205 can be coupled in close contact with the inner side of the air outlet 150. Thus, bonding force between the mask body 10 and the mask body cover 20 can be further improved.

Figure 10:
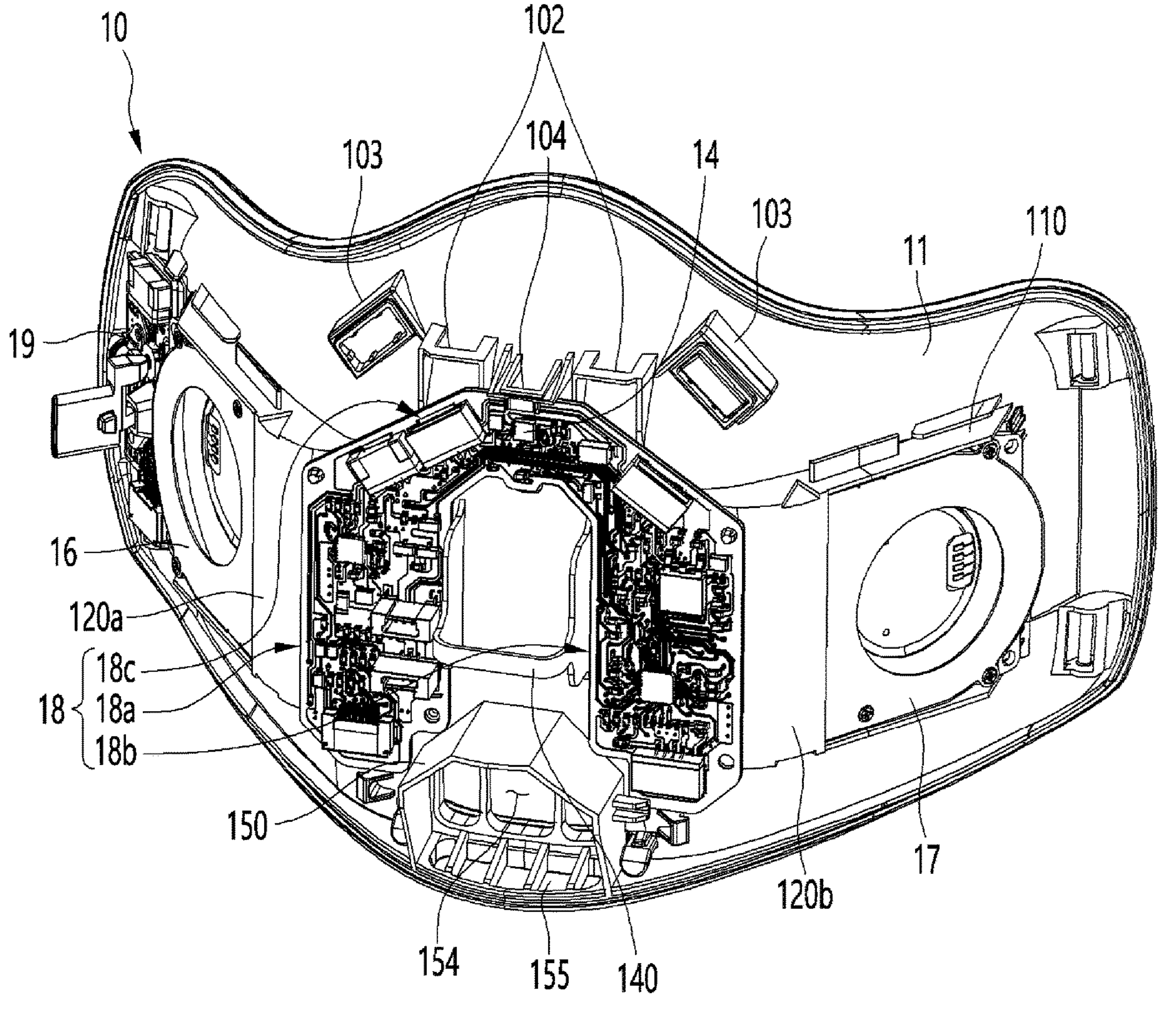
FIG. 10 is a front perspective view showing the mask apparatus, where the mask body cover and a battery are removed.
Figure 11:
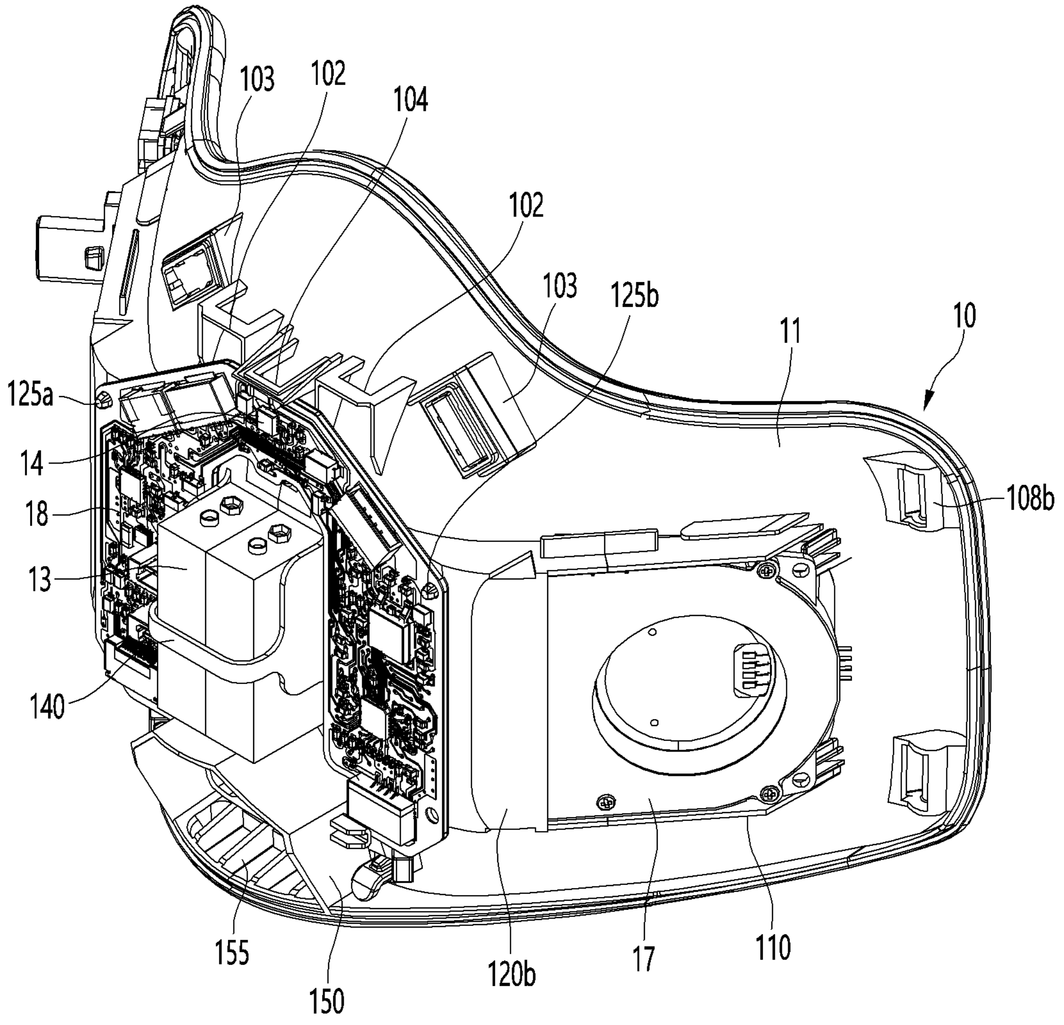
FIG. 11 is a left perspective view showing the mask apparatus, where the mask body cover is removed.
Figure 12:
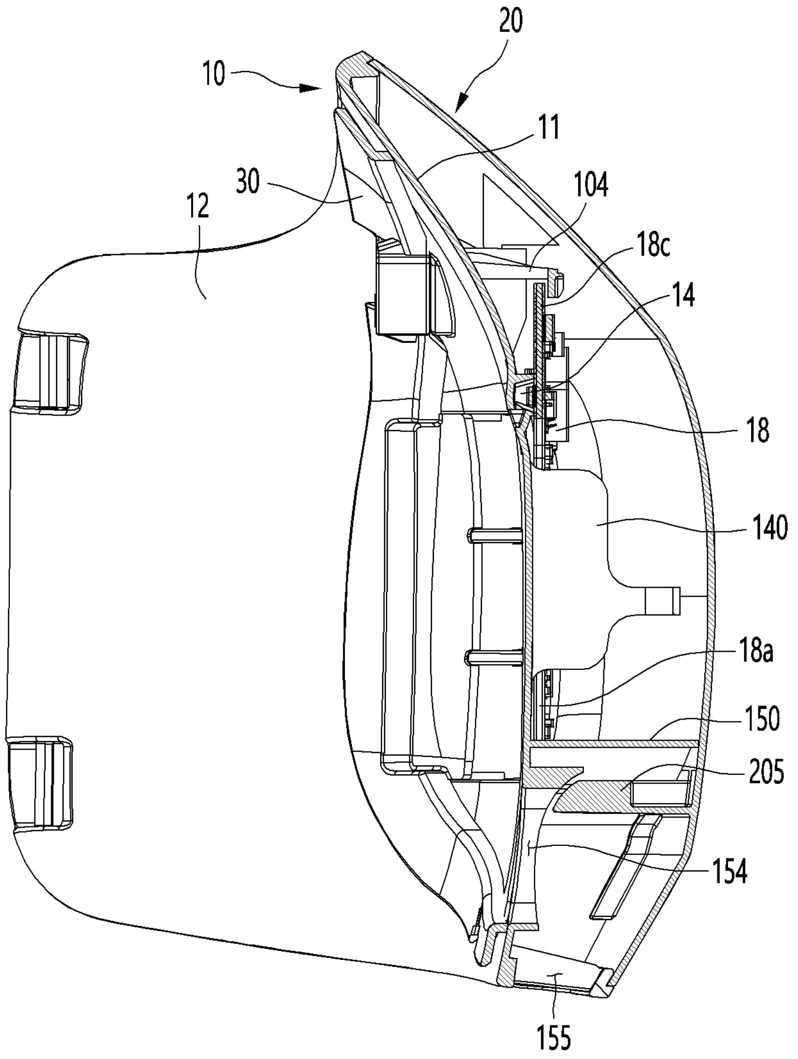
FIG. 12 is a longitudinal cross-sectional view showing the mask apparatus.
Figure 14:
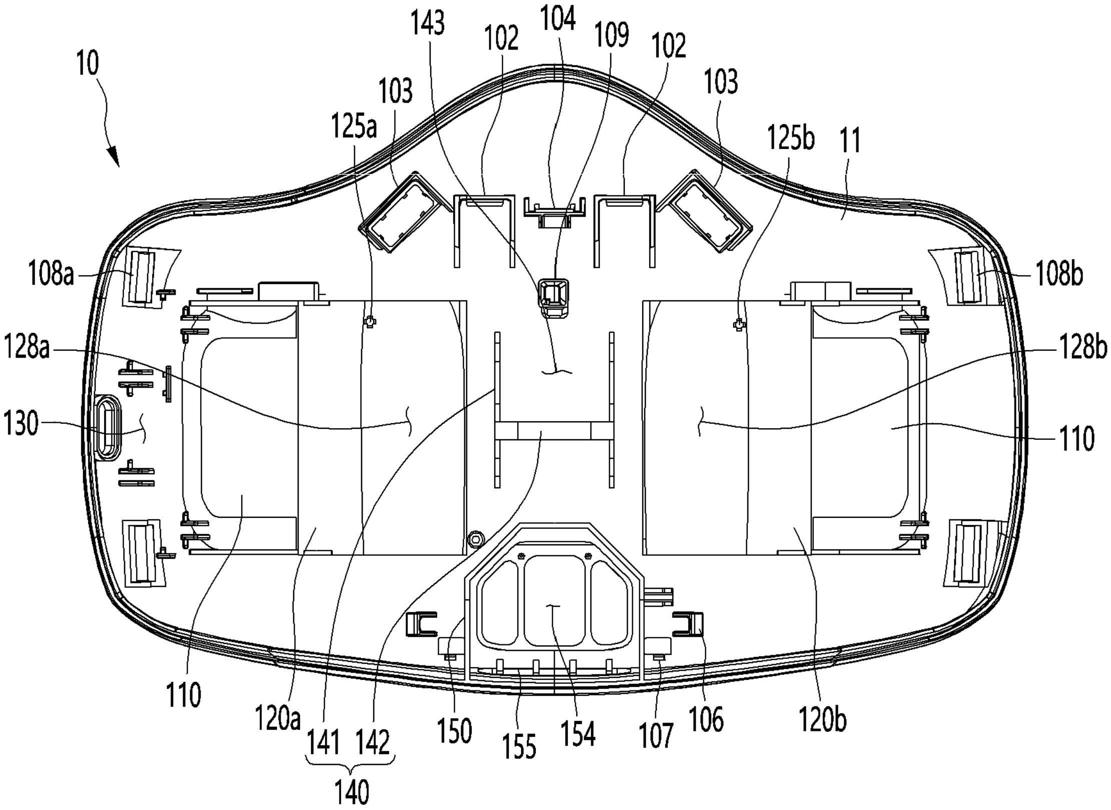
FIG. 14 is a front view showing the mask body.

FIG. 10 is a front perspective view of the mask apparatus, from which the mask body cover and a battery are removed, FIG. 11 is a left perspective view of the mask apparatus, from which the mask body cover is removed, FIG. 12 is a longitudinal cross-sectional view of the mask apparatus, FIG. 13 is a left perspective view of a mask body, and FIG. 14 is a front view of the mask body.

Referring to FIGS. 10 to 14, the mask apparatus 1 includes a mask body 10 on which a plurality of electronic components are installed, and a mask body cover 20 detachably coupled to the mask body 10. The mask body cover 20 can cover the plurality of electronic components mounted on the mask body 10 to prevent the plurality of electronic components from being exposed to the outside.

When the mask body cover 20 is separated from the mask body 10, the entire surface of the mask body 10 can be exposed as illustrated in FIG. 10.

The mask body 10 can be coupled to the rear of the mask body cover 20. The mask body 10 can be provided to be elongated in the left and right direction, and a center portion of the mask body 10 can be convexly rounded forward. The center region or central area having the battery mounting portion 140 can be defined at the center portion of the mask body 10. That is, the center portion of the mask body 10 can be a part of the mask body 10 that is located at the center region or central region of the mask body 10.

In some examples, like the mask body cover 20, the mask body 10 can be provided symmetrically in a horizontal direction with respect to the vertical surface passing through the center. That is, the mask body 10 can have a shape and size corresponding to the mask body cover 20.

The mask body 10 can include a body front surface 11 coupled to the mask body cover 20 and a body rear surface 12 coupled to the sealing bracket 30 or the seal 40.

The body front surface 11 defines a space in which the plurality of electronic components are mounted, and a plurality of structures coupled with the mask body cover 20 are provided.

In some implementations, a battery 13 can be disposed at the center of the body front surface 11. The battery 13 can supply power to at least one of the control module 18, the power module 19, or the fan modules 16 and 17.

The battery 13 can have sufficient capacity to enable high-speed rotation of the fan modules 16 and 17. The battery 13 can be provided in a plurality and connected to in parallel to each other.

For example, in the battery 13, two batteries, each of which has a capacity of 400 mAh, can be connected to each other in parallel to each other. In some examples, the battery 13 can be provided as a relatively light lithium ion battery.

Thus, the battery 13 has an advantage that the battery capacity increases relative to the same weight to increase in driving time and enable a high-speed operation of the fan.

Alternatively, the battery 13 can be provided with one large-capacity battery.

The battery 13 can be relatively heavy among the electronic components. Thus, the battery 13 can be disposed at a central portion of the mask body 10 hung on the user's nose.

The battery 13 can be relatively heavy among the electronic components. Thus, the battery 13 can be disposed at a central portion of the mask body 10 hung on the user's nose.

In some implementations, the battery 13 can be disposed between the first fan module 16 and the second fan module 17. For example, the battery 13 can be disposed at an intermediate point between the first fan module 16 and the second fan module 17.

The first fan module 16, the battery 13, and the second fan module 17 can be arranged in a line in the widthwise direction of the body front surface 11. As a result, a load can be dispersed to left and right sides of the mask apparatus.

In some examples, since the load of the battery 13 is dispersed throughout the mask, the user can feel less load on his/her ears when wearing the mask apparatus 1, when compared to a case in which the battery 13 is disposed at the edge of the mask body 10.

In some examples, since the battery 13 is disposed at the center of the mask body 10, power can be easily provided to some or all of the control module 18, the power module 19, and the fan modules 16 and 17. That is, wires can be connected to various electronic components to supply power.

In some implementations, a battery mounting portion 140 supporting the battery 13 is disposed at the central portion of the body front surface 11. The battery mounting portion 140 can have a rib shape protruding forward from the body front surface 11.

In some examples, the battery mounting portion 140 can include a pair of vertical ribs 141, each of which is disposed to be elongated in the vertical direction on the body front surface 11, and a horizontal rib 142 connecting the pair of vertical ribs 141 to each other.

The pair of vertical ribs 141 can be provided to be spaced apart from each other in the left and right direction so as to be symmetrical to each other with respect to the center of the body front surface 11. In some examples, each front end of the pair of vertical ribs 141 can be bent in a direction facing each other to provide the horizontal ribs 142. Thus, the pair of vertical ribs 141 and horizontal ribs 142 can define an accommodation space 143 that accommodates the battery 13.

When the battery 13 is accommodated in the accommodation space 143, a front surface of the battery 13 can be supported by the horizontal ribs 142, and a side surface of the battery 13 can be supported by the vertical ribs 141. In some examples, when the battery 13 is accommodated in the accommodation space 143, a lower end of the battery 13 can be supported by an upper end of the air discharge portion 150.

For example, at least a portion of a top surface of the air discharge portion 150 can have a horizontal surface. In some examples, the lower portion of the battery 13 can be supported in contact with the top surface of the air discharge portion 150. As a result, the battery 13 can be in a state in which all the front, side, and bottom surfaces of the battery 13 are supported by the vertical ribs 141, the horizontal ribs 142, and the air discharge portion.

From the above configuration, the battery 13 can be restricted from being removed from the battery mounting portion 140, and the battery 13 can be stably supported.

In some examples, since the battery 13 is disposed adjacent to the upper portion of the air discharge portion 150, the battery 13 can be naturally cooled by the air discharged through the air discharge portion 150. In detail, since the lower end of the battery 13 is in direct contact with the top surface of the air discharge portion 150, the battery 13 can be more quickly cooled through heat conduction. That is, air exhaled by the user can absorb heat released from the battery 13 and then can be discharged to the outside of the mask apparatus 1.

In some implementations, a control module 18 is disposed at a center of the body front surface 11. The control module 18 can be electrically connected to the power module 19, the fan modules 16 and 17, and the battery 13. The control module 18 can be seated on the front surface of the air duct 120 through which air suctioned from the fan modules 16 and 17 flows and can be cooled by air flowing along the air duct 120. That is, heat generated in the control module 18 can be transferred to the air flowing along the air duct 120 through heat conduction between the front surface of the air duct 120 and the control module 18.

The control module 18 can include a processor, a controller, an electric circuit, an integrated circuit, or the like.

In some implementations, the control module 18 can be disposed between the first fan module 16 and the second fan module 17. For example, the control module 18 can be disposed at the intermediate point between the first fan module 16 and the second fan module 17.

Here, the first fan module 16, the control module 18, and the second fan module 17 can be arranged on the body front surface 11 in a line in the widthwise direction of the body front surface 11. That is, the first fan module 16 and the second fan module 17 can be horizontally symmetrically disposed with respect to the control module 18.

In some examples, the control module 18 can be disposed to surround the battery 13. Here, the central portion of the control module 18 can be opened, and the battery 13 can be disposed at the opened center of the control module 18.

The control module 18 can have an n-shape with an opened central portion to avoid an interference with the battery 13. For example, the control module 18 can be provided as an n-shaped single substrate, or a plurality of substrates 18*a*, 18*b*, and 18*c* can be connected to each other to define the n-shape.

In some implementations, the substrate constituting the control module 18 can include a first substrate 18*a* disposed at a right side and a second substrate 18*b* disposed on at left side with respect to the body front surface 11, the substrate constituting the control module 18 can further include a third substrate 18*c* connecting the first substrate 18*a* to the second substrate 18*b*. The first substrate 18*a*, the second substrate 18*b*, and the third substrate 18*c* can be integrated with each other.

The first substrate 18*a* can be disposed at a right side of the battery 13, the second substrate 18*b* can be disposed at a left side of the battery 13, and the third substrate 18*c* can be disposed above the battery 13. The third substrate 18*c* can be disposed to avoid overlapping with the battery 13. Thus, the battery 13 and the control module 18 can be efficiently and densely disposed within a limited space.

Control module mounting portions 128*a* and 128*b* on which the control module 18 is mounted are disposed on the body front surface 11. The control module mounting portions 128*a* and 128*b* can be provided so that a portion of the front surface of the air duct 120 is provided in a plane.

Coupling portions 125*a* and 125*b* for coupling the substrates 18*a*, 18*b*, and 18*c* of the control module 18 are disposed on the control module mounting portions 128*a* and 128*b*. The plurality of coupling portions 125*a* and 125*b* can be disposed on the first control module mounting portion 128*a* and the second control module mounting portion 128*b*, respectively.

For example, the plurality of coupling portions 125*a*, 125*b* pass through portions of edges of the substrates 18*a*, 18*b*, 18*c*, respectively, so that the control module 18 is fixed to the control module mounting portions 128*a*, 128*b*. Alternatively, a separate coupling member can pass through the substrates 18*a*, 18*b*, and 18*c* to be coupled to the control module mounting portions 128*a* and 128*b*.

In some implementations, the first substrate 18*a* can be disposed on the first control module mounting portion 128*a* of the air duct 120, and the second substrate 18*b* can be disposed on the second control module mounting portion 128*b* of the air duct 120, and the third substrate 18*c* can be disposed above the air duct 120. Thus, the air suctioned from the first fan module 16 and the second fan module 17 can pass through the air duct 120 to cool the first substrate 18*a*, the second substrate 18*b*, and the third substrate 18*c*.

In summary, a plurality of heat generation elements (e.g., the control module 18, the battery 13, etc.) are densely arranged in the central portion of the mask apparatus 1. Here, since the air passage through which the air suctioned from the outside flows is disposed adjacent to the heat generation elements, heat dissipation for the heat generation elements can be effectively performed.

The mask apparatus 1 further includes a pressure sensor 14. The pressure sensor 14 can be disposed on a sensor mounting portion 109 disposed on the body front surface 11 to sense a pressure of a breathing space.

The pressure sensor 14 can be installed on the substrate of the control module 18 and can be disposed in an installation space defined inside the sensor mounting portion 109. For example, the pressure sensor 14 can be installed on the third substrate 18*c* to protrude to the rear of the third substrate 18*c*. For this, the third substrate 18*c* can be disposed in front of the sensor mounting portion 109.

When the pressure sensor 14 is disposed in the installation space of the sensor mounting portion 109, information of the breathing space can be obtained from air introduced into the installation space through a hole communicating with the installation space and the breathing space.

Pressure information or breathing information sensed by the pressure sensor 14 can be provided to the control module 18, and operations of the fan modules 16 and 17 can be controlled based on the pressure information and breathing information.

The sensor mounting portion 109 can have a rectangular shape of which the inside is empty, but is not limited thereto. For example, the sensor mounting portion 109 can include a first portion 109*a* having a predetermined width and protruding in a direction parallel to the ground, a pair of second portions 109*c* extending downward from each of both sides of the first portion 109*a*, and a third portion 109*b* connecting ends of the pair of second portions 109*c* to each other.

The first portion 109*a* can define a top surface of the sensor mounting portion 109, the second portion 109*c* can define both side surfaces of the sensor mounting portion 109, and the third portion 109*b* can define a bottom surface of the sensor mounting portion 109.

The first fan module 16 and the second fan module 17 are disposed on both sides of the body front surface 11, respectively. The first fan module 16 can be disposed at a right side of the control module 18, and the second fan module 17 can be disposed at a left side of the control module 18.

The first fan module 16 is mounted on a first fan module mounting portion 110*a* disposed at the right side of the body front surface 11, and the second fan module 17 is mounted on a second fan module mounting portion 110*b* disposed at the left side of the body front surface 11. The first fan module 16 and the second fan module 17 can be disposed to be symmetrical to each other in the left and right direction with respect to the center of the mask body 10.

The power module 19 can be disposed on the edge of the body front surface 11. The power module 19 can receive power from a power source to perform a function of turning on or off the power of the mask apparatus 1. The power module 19 can be disposed on a side of any one of the first fan module 16 and the second fan module 17. That is, the power module 19 can be disposed on a left edge or a right edge of the body front surface 11.

A power module mounting portion 130 for mounting the power module 19 is disposed on the body front surface 11. The power module mounting portion 130 can include a plurality of ribs, which are disposed on the left edge or the right edge of the body front surface 11 to support the power module 19.

The battery 13, the control module 18, the fan modules 16 and 17, and the power module 19 can be arranged in a line in a widthwise direction of the mask body 10. For example, the widthwise direction of the mask body 10 can be parallel to a left-right direction extending through the fan modules 16 and 17.

In some implementations, since the plurality of electronic components are densely disposed within the limited space of the mask apparatus 1, there can be an advantage that the mask apparatus 1 is compact. In some examples, since the electronic components such as the battery 13 and the control module 18, which increase in temperature due to the heat generation, are disposed at the point adjacent to the air passage through which air is inhaled by the user flows, the heat of the battery 13 and the control module 18 can be naturally cooled.

What is claimed is:

1. A mask apparatus comprising:
- a mask body configured to receive a battery at a center region of a front surface of the mask body;
- a plurality of electronic components that are disposed at the mask body and that comprise:
  - a pair of fan modules configured to be disposed at left and right sides of the battery, respectively, and
  - a control module configured to be disposed between the pair of fan modules; and
- a mask body cover that is coupled to the mask body and covers the plurality of electronic components,
- wherein the center region, the pair of fan modules, and the control module are arranged along a widthwise direction of the mask body, and
- wherein the control module comprises:
  - a first substrate configured to be disposed between the battery and a first fan module of the pair of fan modules, and
  - a second substrate configured to be disposed between the battery and a second fan module of the pair of fan modules.

2. The mask apparatus according to claim 1, wherein the control module further comprises a third substrate that connects an upper end of the first substrate to an upper end of the second substrate and that is configured to surround an upper edge of the battery.

3. The mask apparatus according to claim 1, further comprising a seal that is coupled to a rear surface of the mask body and defines a breathing space therein.

4. The mask apparatus according to claim 3, wherein the mask body defines an air exhaust hole at a lower portion of the mask body, the air exhaust hole being configured to discharge air exhaled into the breathing space to an outside of the mask body.

5. The mask apparatus according to claim 4, wherein the air exhaust hole is positioned at a front side of the breathing space.

6. The mask apparatus according to claim 4, wherein at least one of the battery or the control module is configured to be disposed above the air exhaust hole.

7. The mask apparatus according to claim 4, further comprising an air outlet that protrudes from the front surface of the mask body and partitions the air exhaust hole from an inner space defined between the mask body and the mask body cover.

8. The mask apparatus according to claim 7, wherein the air outlet protrudes forward relative to the front surface of the mask body and extends along an edge of the air exhaust hole.

9. The mask apparatus according to claim 8, wherein the air outlet has an arch shape or a tunnel shape that extends along the edge of the air exhaust hole.

10. The mask apparatus according to claim 9, wherein a front end of the air outlet is in contact with a rear surface of the mask body cover.

11. The mask apparatus according to claim 7, wherein the air outlet comprises a top surface configured to support the battery.

12. The mask apparatus according to claim 1, further comprising a seal that is coupled to a rear surface of the mask body and defines a breathing space therein,
- wherein the mask body further comprises a plurality of air ducts, each of the plurality of air ducts being configured to guide air from one of the pair of fan modules to the breathing space.

13. The mask apparatus according to claim 12, wherein the plurality of air ducts comprises:
- a first air duct configured to be disposed between the battery and the first fan module; and
- a second air duct configured to be disposed between the battery and the second fan module.

14. The mask apparatus according to claim 13, wherein the first substrate is disposed at a front surface of the first air duct, and the second substrate is disposed at a front surface of the second air duct, and
- wherein at least a portion of each of the front surface of the first air duct and the front surface of the second air duct is flat.

15. The mask apparatus according to claim 1, wherein the mask body comprises a battery mounting portion disposed at the center region of the front surface of the mask body and configured to accommodate the battery.

16. The mask apparatus according to claim 15, wherein the battery mounting portion comprises:
- a vertical rib that protrudes forward from the mask body and is configured to support a side surface of the battery; and
- a horizontal rib connected to the vertical rib and configured to support a front surface of the battery.

17. The mask apparatus according to claim 16, wherein the vertical rib comprises a pair of vertical ribs that protrude forward from the mask body and are configured to support side surfaces of the battery, and
- wherein the horizontal rib connects the pair of vertical ribs to each other.

18. The mask apparatus according to claim 2, further comprising a support rib that extends from the front surface of the mask body and supports the control module.

* * * * *